US012374056B2

(12) United States Patent
Edwards

(10) Patent No.: US 12,374,056 B2
(45) Date of Patent: Jul. 29, 2025

(54) SYSTEMS AND METHOD FOR RENDERING OF VIRTUAL OBJECTS

(71) Applicant: Adeia Guides Inc., San Jose, CA (US)

(72) Inventor: Warren Keith Edwards, Atlanta, GA (US)

(73) Assignee: Adeia Guides Inc., San Jose, CA (US)

( * ) Notice: Subject to any disclaimer, the term of this patent is extended or adjusted under 35 U.S.C. 154(b) by 135 days.

(21) Appl. No.: 17/943,033

(22) Filed: Sep. 12, 2022

(65) Prior Publication Data

US 2024/0087247 A1 Mar. 14, 2024

(51) Int. Cl.
*G06T 19/00* (2011.01)
*G06T 11/60* (2006.01)

(52) U.S. Cl.
CPC ............ *G06T 19/006* (2013.01); *G06T 11/60* (2013.01)

(58) Field of Classification Search
None
See application file for complete search history.

(56) References Cited

U.S. PATENT DOCUMENTS

| | | | | |
|---|---|---|---|---|
| 2016/0093080 | A1* | 3/2016 | Tumanov | G06T 11/60 345/589 |
| 2016/0246760 | A1* | 8/2016 | Marra | G06T 11/60 |
| 2016/0307374 | A1* | 10/2016 | Kurz | G06F 3/012 |
| 2016/0316196 | A1 | 10/2016 | Mackenzie et al. | |
| 2016/0342782 | A1 | 11/2016 | Mullins et al. | |
| 2018/0315248 | A1* | 11/2018 | Bastov | G06T 19/006 |
| 2019/0172262 | A1* | 6/2019 | McHugh | G06F 3/011 |
| 2020/0186775 | A1 | 6/2020 | Lin et al. | |
| 2021/0173474 | A1 | 6/2021 | Sztuk et al. | |
| 2021/0240260 | A1 | 8/2021 | Ronkainen et al. | |
| 2023/0026638 | A1 | 1/2023 | Schoen | |
| 2024/0087191 | A1 | 3/2024 | Edwards | |

FOREIGN PATENT DOCUMENTS

WO 2014182545 A1 11/2014

OTHER PUBLICATIONS

"Hologram stability," (2021) (11 pages) (https://learn.microsoft.com/en-us/windows/mixed-reality/develop/advanced-concepts/hologram-stability).

(Continued)

*Primary Examiner* — Yi Wang
(74) *Attorney, Agent, or Firm* — Haley Guiliano LLP

(57) ABSTRACT

An augment reality (AR) system captures an image of a physical environment. The AR system identifies an object in the captured image to serve as an anchor point. The AR system calculates a distance between the identified object and an AR display device that comprises left and right displays. The AR system identifying a virtual object associated with the anchor point. The AR system then generates for simultaneous display: (a) a first separate image of the virtual object on the left display of the AR device, and (b) a second separate image of the virtual object on the right display of the AR device, such that apparent distance of the virtual object of the composite image of the first separate image and the second separate image is set to the calculated distance between the identified object and the AR display device.

18 Claims, 17 Drawing Sheets

(56) References Cited

OTHER PUBLICATIONS

Cutolo et al., "Optical See-Through Head-Mounted Displays With Short Focal Distance: Conditions for Mitigating Parallax-Related Registration Error," Frontiers in Robotics and AI, Dec. 4, 2020 (15 pages).

Duchowksi et al., "Reducing visual discomfort of 3D stereoscopic displays with gaze-contingent depth-of-field," SAP 14: Proceedings of the ACM Symposium on Applied PerceptionAug. 2014 pp. 39-46 (https://doi.org/10.1145/2628257.2628259).

Gabbard et al., "Active Text Drawing Styles for Outdoor Augmented Reality: A User-Based Study and Design Implications," Proceedings of IEEE Virtual Reality 2007, Mar. 10-14, pp. 35-42, Charlotte, North Carolina, USA, © 2007 IEEE.

Grasset et al., "Image-driven view management for augmented reality browsers," 2012 IEEE International Symposium on Mixed and Augmented Reality (ISMAR), 2012, pp. 177-186, doi: 10.1109/ISMAR.2012.6402555.

Ichihashi et al., "Estimating Visibility of Annotations for View Management in Spatial Augmented Reality Based on Machine-Learning Techniques," Sensors (Basel). Feb. 22, 2019;19(4):939. doi: 10.3390/s19040939. PMID: 30813372; Pmcid: PMC6412218.

Leykin et al., "Automatic determination of text readability over textured backgrounds for augmented reality systems," Third IEEE and ACM International Symposium on Mixed and Augmented Reality, 2004, pp. 224-230, doi: 10.1109/ISMAR.2004.22.

Scaling AR pictures based on the distance from the camera (undated) (4 pages) (https://stackoverflow.com/questions/11913355/scaling-ar-pictures-based-on-the-distance-from-the-camera).

Sun et al., "View-Dependent Text Placement for Augmented Reality Using Offset Surface," (undated) (8 pages) po (https://www.cs.umd.edu/sites/default/files/scholarly_papers/Sun%2C%20Xuetong_1801.pdf).

U.S. Appl. No. 17/943,030, filed Sep. 12, 2022, Warren Keith Edwards.

U.S. Appl. No. 17/943,031, filed Sep. 12, 2022, Warren Keith Edwards.

* cited by examiner

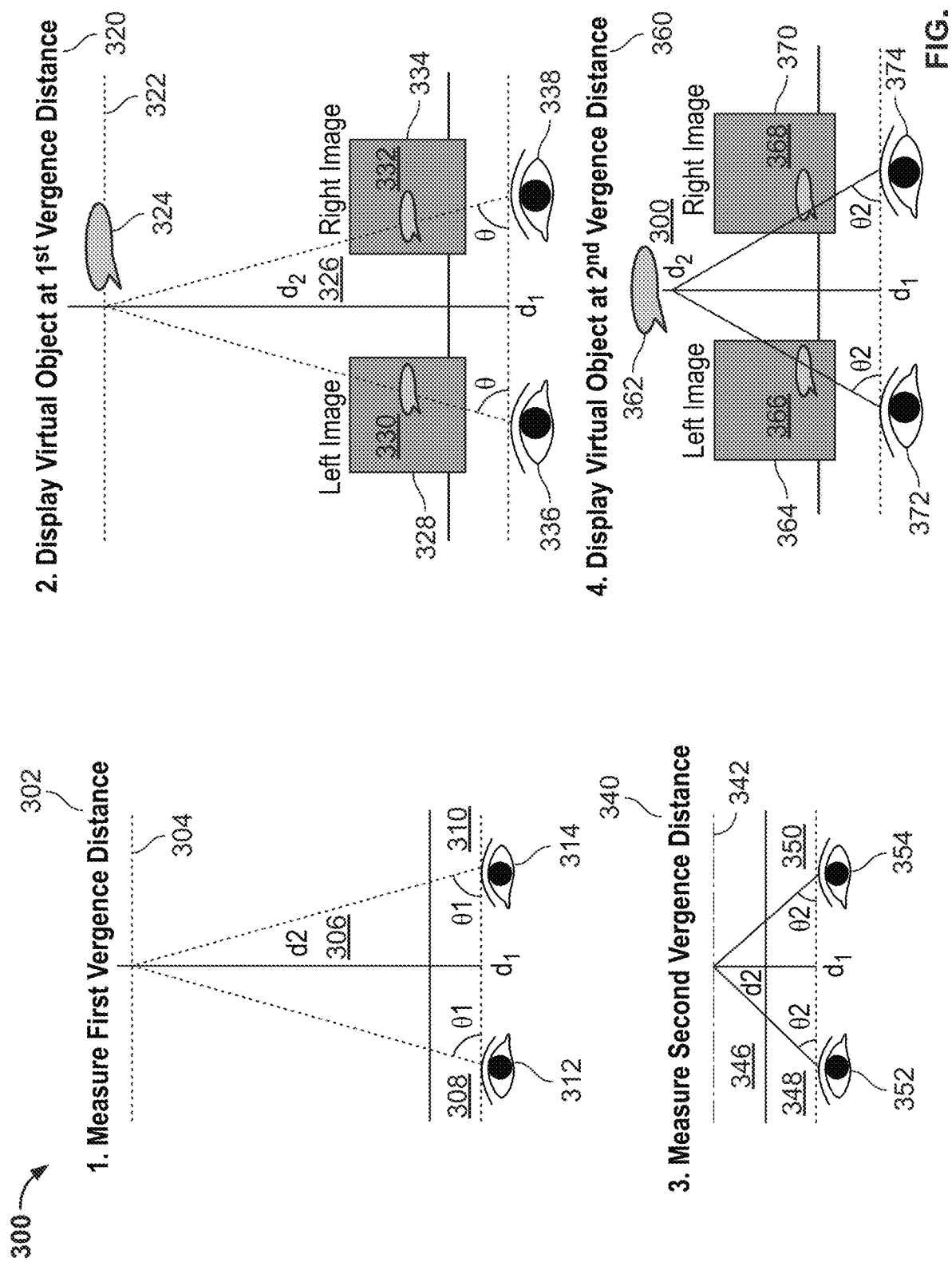

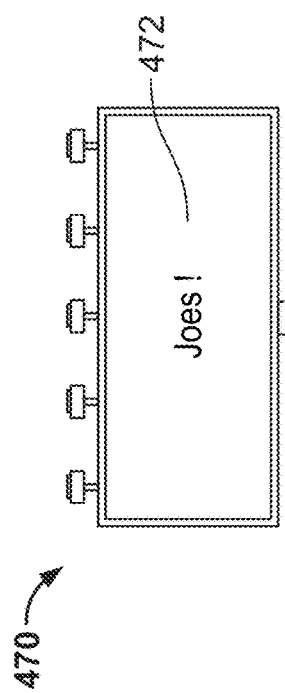
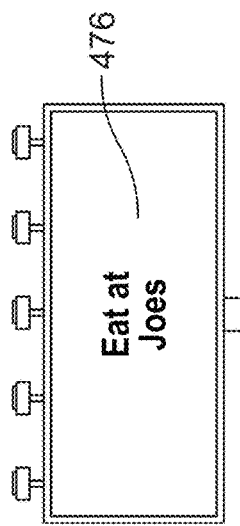
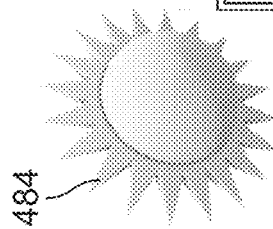
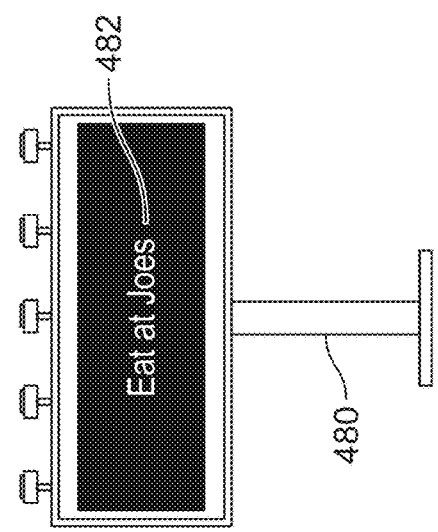
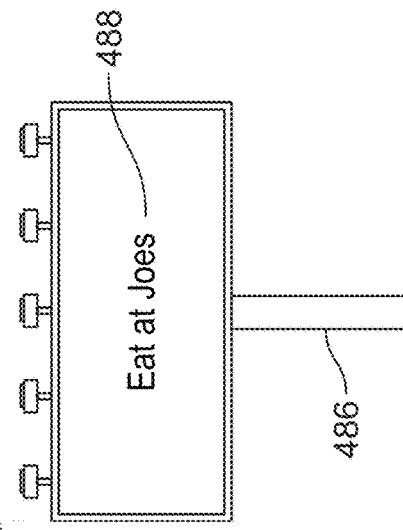
FIG. 4B
FIG. 4C
FIG. 4D
FIG. 4E

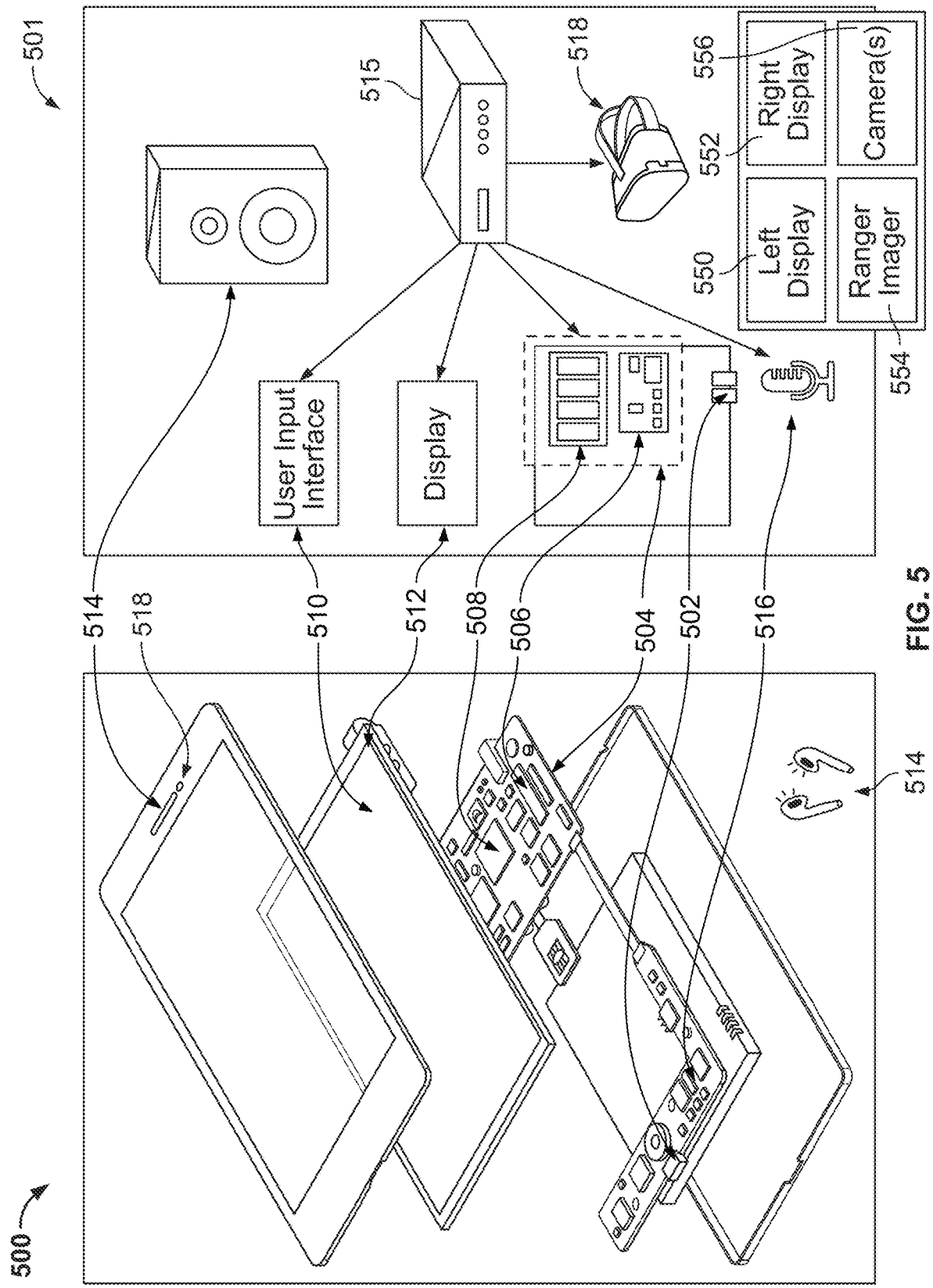

SYSTEMS AND METHOD FOR RENDERING OF VIRTUAL OBJECTS

BACKGROUND

This disclosure is directed to systems and methods for augmented reality (AR) image and video generation and in particular for modification of rendering of virtual objects in AR environment based on object depth.

SUMMARY

Modern augmented reality systems are capable of combining computer-generated virtual content with real-world objects in a scene using a variety of hardware (e.g., head mounted display devices). In one approach, an AR display device includes both a display and a transparent material to overlay virtual objects over natural view of a physical world, e.g., an optical see-through (OST) effect. In another approach, AR display device fully obscures the real world, but feed images captured from the real environment into its display to create a video see-through (VST) effect. The video see-through image may be further augmented with virtual objects.

In one example, an AR system may add virtual objects (e.g., computer-generated text labels) to a scene to provide navigation directions, annotate a physical object, or provide buttons or other interactive objects to the user. To place virtual objects, the AR system first determines the placement for such virtual objects. For example, the AR system checks that such content does not block key objects in the real-world scene (e.g., direction markers shouldn't obscure the intersections they are meant to denote) and positions the virtual objects in a way that they are visible and legible to the user. These challenges are compounded when using a stereoscopic AR display device (e.g., AR glasses or a headset, in which two displays present content to the left and right eyes). In such a case, in addition to merely finding gaps to place content, the AR display device displays virtual objects as situated at an apparent depth that makes it easy to perceive. Further, the AR system may alter virtual objects' locations on-the-fly as depth relationships of real-world object change (e.g., due to movement of the AR display device).

In one approach, the AR application may attempt to display a virtual object; however, when displayed in the scene, this content may be displayed too far away to be readable. For instance, the font size at such a distance may appear too small for the letters to be distinguishable. Further, the apparent distance at which such virtual content is displayed may not correspond to the distance of the real-world object with which it is associated. Accordingly, there is a need for mechanisms to determine ideal depth placement for virtual objects within an ever-changing real-world scene, and to adapt placement of such objects based on distance.

To overcome these problems, several techniques are provided for an AR system (e.g., a video see-through AR system with right and left displays and for overlay AR systems). One of such techniques may allow for placement of virtual objects at apparent distance (e.g., vergence distance) based on range imaging. In this approach, the AR system captures an image of a physical environment (e.g., with one or more cameras). The AR system identifies an object in the captured image to serve as an anchor point (e.g., a mountain object may be selected to show textual description of the mountain). The AR system then calculates the distance between the identified object and augmented reality (AR) display device that comprises left and right displays (e.g., using parallax in the images captured by two cameras, or using a laser ping). The AR system may then identify a virtual object associated with the anchor point (e.g., the textual description of the mountain may be retrieved from a database).

The AR system may then generate for simultaneous display a first separate image of the virtual object on the left display of the AR device and a second separate image of the virtual object on the right display of the AR device. The location of the separate image on each respective display is selected in such a way that, when viewed by a user with appropriate eye vergence, the apparent virtual-world distance of the virtual object of the composite image of the first separate image and the second separate image is set to the calculated real-world distance between the identified object and the AR display device. In this way, when a user looks at the plane of the anchor object, the anchor object and the associated virtual item appear to the user to be located at the same apparent distance, e.g., because the user's eye vergence is the same when looking at the anchor object and the associated virtual item. Such matching vergence may impose operations of the AR system by making the displayed AR environment easier to look at and more consistent.

Another technique for improving operations of the AR system that generates for display a VST image includes selective blurring of objects in the VST image presented via an AR display device. For instance, the AR system captures an image of a physical environment and identifies a plurality of objects in the captured image. The AR system then identifies dynamic user's vergence plane based on biometric information of a user of AR display device (e.g., by measuring rotation of the user's eyes). The AR system than divides up objects in the VST image (e.g., both real and virtual objects) into two sets: (i) a set of objects proximate to the vergence plane and (ii) a set of objects not proximate to the vergence plane.

The AR system then applies a filter (e.g., a blur filter) to the subset of the plurality of objects in the captured image that are not in a region proximate the dynamic user's vergence plane. At the same time, the objects that are in a region proximate the dynamic user's vergence plane are not blurred. The AR system then generates for display, on the AR display device, the modified image with some objects being blurred. In some embodiments, the objects are blurred to different degree depending on how far away they are from the dynamic user's vergence plane. In this way, the AR system generates for display a VST image of the real world that is more similar to real world perception of the physical world.

In another technique for improving operations of the AR system, the AR system identifies a relevant virtual object that is to be inserted into the VST image (e.g., a system notification, an alert, a message from a relevant contact, etc.) and keeps these virtual objects at the user's dynamic vergence plane for a certain period of time even if the user's eyes' vergence changes.

First, the AR system identifies a virtual object that is to remain at a dynamic user's vergence distance from an AR display device. Then, the AR system computes a first dynamic user's vergence distance based on biometric information of a user of the AR display device. The identified virtual object is then displayed such that its apparent distance to the AR device is equal to the computed first dynamic user's vergence distance.

Later (e.g., after the user's eye rotation changes), the AR system computes a second dynamic user's vergence distance based on biometric information of a user of the AR display device that is different from the first dynamic user's vergence distance. In response, the AR device, generates for display a modified composite image using the left and the right displays of the AR display device, wherein apparent distance of the modified composite image to the AR device is equal to the computed second dynamic user's vergence distance. In this way, the AR system assures that relevant virtual objects remain at user's eyes' dynamic vergences distance, even when the user's eyes may rotate to concentrate on different object in the VST display.

In another technique for improving operations of the AR system, the AR system adapts text renderings in AR environment based on virtual distance. The AR accesses an instruction to insert a text item into AR environment in association with an anchor object in a physical environment. The AR system pre-renders the text item overlaid over the anchor point in a pre-rendered VST image (e.g., virtual text description of an item is pre-render on an VST image of a real billboard). The AR System then computes a legibility score for the pre-rendered text item based on, e.g., textual properties of the text item image properties of the anchor object and distance of the anchor object to an AR display device. If the score is below a threshold legibility score, the AR system may adjust one or more of the textual properties of the text item (e.g., font of the text item, color of the text item, and/or texture of the text item).

In some embodiments, the AR system may also adjust the image properties of an anchor object displayed in the VST image (e.g., by making the image of a real object appear differently in a VST image). For example, the background, size, distance, or lighting of the anchor object may be adjusted to achieve a higher legibility score. The pre-rendering process and adjustment may be repeated, e.g., until a legible combination is found. The AR system then generates for display on the AR display device, the adjusted text item overlaying the anchor object. In this way, the legibility of text in VST AR system may be improved by ensuring legibility of text. In some embodiments, a text item to be display may be real-world text from an image of the real environment. For example, a text that is not readable in the real world can be treated as virtual text item to be inserted and adjusted to improve its legibility.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

FIG. 3 shows an exemplary implementation of augmented reality image generation with a virtual object that remain at dynamic user's vergence distance, in accordance with some embodiments of this disclosure;

FIG. 4B shows another exemplary implementation of augmented reality image generation with inserted textual item, in accordance with some embodiments of this disclosure;

FIG. 4C shows another exemplary implementation of augmented reality image generation with inserted textual item, in accordance with some embodiments of this disclosure;

FIG. 4D shows another exemplary implementation of augmented reality image generation with inserted textual item, in accordance with some embodiments of this disclosure;

FIG. 4E shows yet another exemplary implementation of augmented reality image generation with inserted textual item, in accordance with some embodiments of this disclosure;

FIG. 5 shows an illustrative computing device, in accordance with some embodiments of this disclosure;

DETAILED DESCRIPTION

The term "anchor" or "anchor object" refers to a physical object to which virtual content may be attached. For example, a virtual shopping link may be attached to a real-world coffee maker device serving as an anchor for the virtual link.

The term "vergence" refers to a measurement (e.g., angles) of a left eye's and a right eye's rotation(s) inwards or outwards in order to focus on an object that is near versus one that is far away. For instance, when the eyes of a user angle inward, e.g., when the user looks at an object that is nearer, and when the eyes angle straight ahead, e.g., when looking an object that are farther away. The term "vergence distance" refers to a distance at which a given object would be given the rotation of the left and right eyes of the user (e.g., detected by measuring a point where user's eyes gazes would intersect and creating a plane though that plane parallel to plane defined by eyes of the user). The term "user's dynamic vergence plane" indicates the plane facing the user that contains all objects at a given vergence distance of the user's eyes at a time. The user's dynamic vergence plane will change as the rotation of user's eye changes.

The term "accommodation" refers to a measurement of contraction or expansion of the lenses in a user's eyes, e.g., due to the user focusing on near objects versus far away objects. More particularly, the eye lens may flatten to focus on far away objects and expand to focus on nearer objects.

Figure 1A:
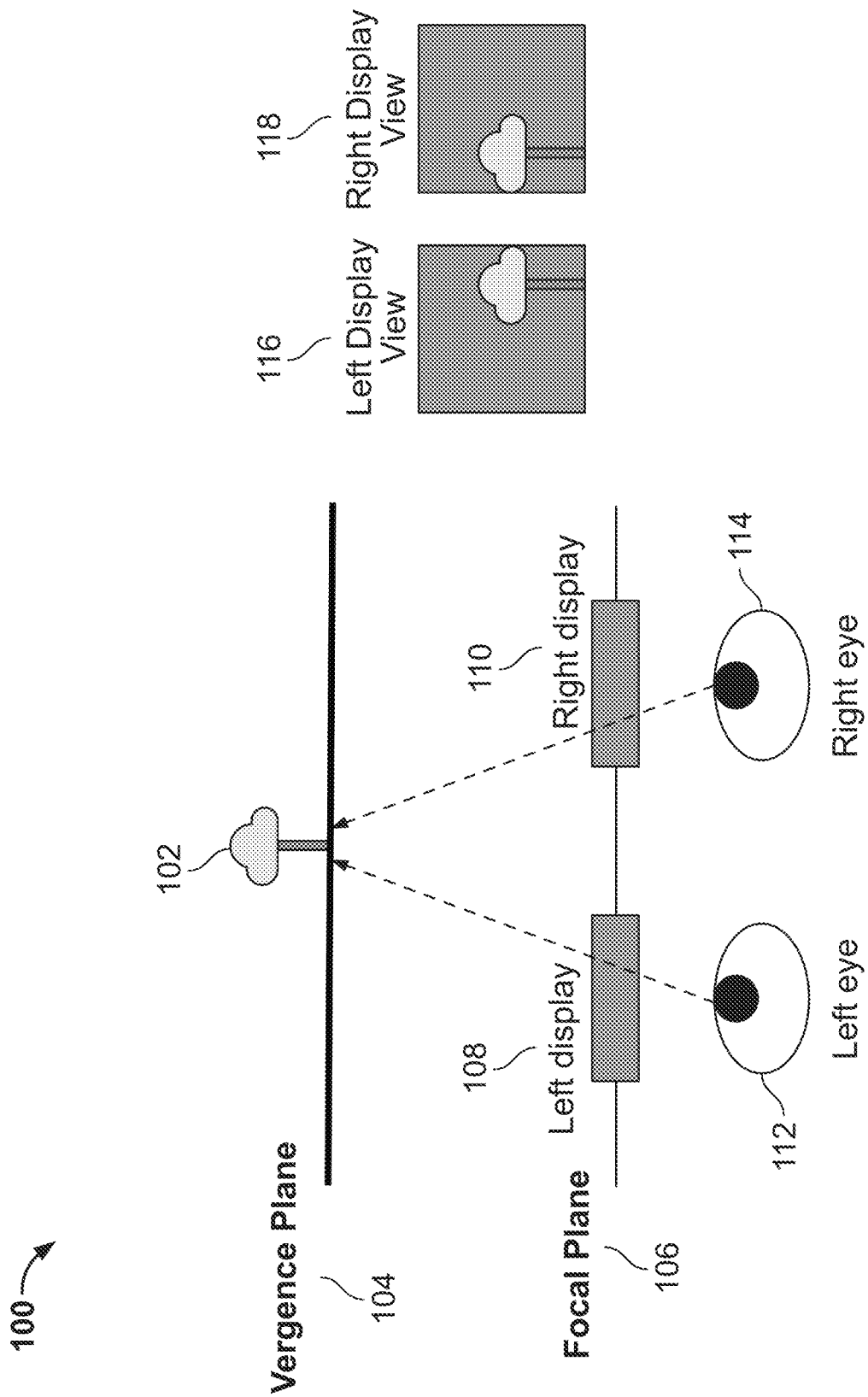
FIG. 1A shows an exemplary implementation of augmented reality image generation, in accordance with some embodiments of this disclosure.

FIG. 1a shows an exemplary implementation of augmented reality system 100 for image generation, in accordance with some embodiments of this disclosure. FIG. 1a shows eyes 112, 114 of a user who using an AR display device (e.g., a VST head mounted display). The VST display may have two displays 108 and 110 each associated with a respective eye. The two displays may be a part of single display (e.g., left and right portions of a display of a cell phone or smartphone inserted into an AR device).

Typically, the accommodation of eyes 112 and 114 will cause the user to focus on focal plane 106 (e.g., a plane defined by flat displays 108 and 110). However, vergence of eyes 112 and 114 may be directed to virtual object 102 at vergence plane 104. This may be achieved by, e.g., showing separate views of object 102 at different locations in left display view 116 of display 108 and right display views 118 of display 110. When a user's eyes rotate to be directed toward the separate images, the combined view of object 102 will appear at an apparent distance corresponding to a distance of vergence plane 104 from AR display or from eyes 112, 114 of the user. This may occur even if eyes 112, 114 accommodation focuses the eyes on plane 106 of the AR devices' screen.

In some embodiments, AR device of system 100 hardware may be one of: (1) Optical See-Through system and (2) Video See-Through system. If the system 100 is an Optical See-Through (OST) system, the user views the real-world aspects of the scene through glass of displays 108 and 110, while virtual content is overlaid on top of it via a "combiner" (often an optical waveguide) that causes the virtual content to appear on top of the real-world view through glass. If the system 100 is a Video See-Through (VST) system, the real-world content is captured via cameras (e.g., of the AR display device), the captured content is then augmented with virtual content, and the unified scene is presented to the user via displays 108 and 110.

VST systems may be monoscopic or stereoscopic systems. In a monoscopic implementation, the combined real-world and virtual content is presented on a single screen, such as the case in phone-based AR. In this implementation, the scene is not rendered in 3D and there are no depth cues (e.g., other than occlusion ordering). In a stereoscopic implementation, two cameras (e.g., of the AR display device) are used to capture the real-world scene, and then the combined content is presented on two separate screens, e.g., one for each eye (in some embodiments, the two screens may be portions of the same screen) such that there is perception of depth. OST systems are "naturally" stereoscopic, since the user perceives the real-world content with both eyes, through glass. OST systems also have "perfect" resolution since the real world is not being captured by a camera. OST systems may experience light loss because the optical waveguides used to combine the images may block some light. Further, there can be registration problems between the virtual and real-world content, as well as requiring the user to shift focus of the eyes (called the fixation point) between objects in the real world and the (fixed) distance to the virtual content.

VST systems, on the other hand, may not have issues with light loss, and in these systems it is easier to align virtual and real-world content since both images are processed in the same pipeline. Moreover, since the eyes 112 and 114 focus on the left and right screens 108 and 110 for all content, there is no difference in fixation point between virtual and real-world content.

Figure 1B:
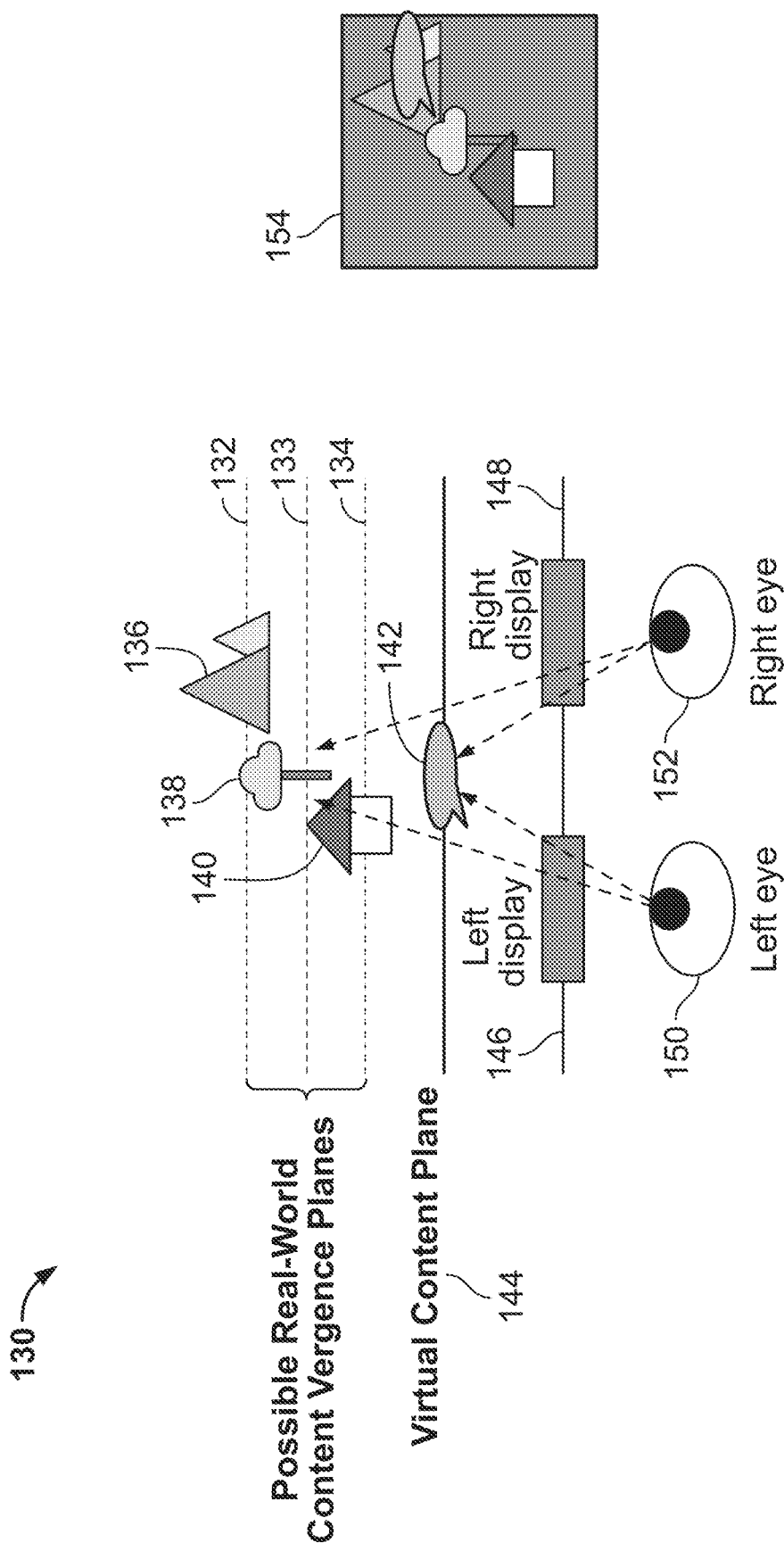
FIG. 1B shows another exemplary implementation of augmented reality image generation, in accordance with some embodiments of this disclosure.
Figure 1C:
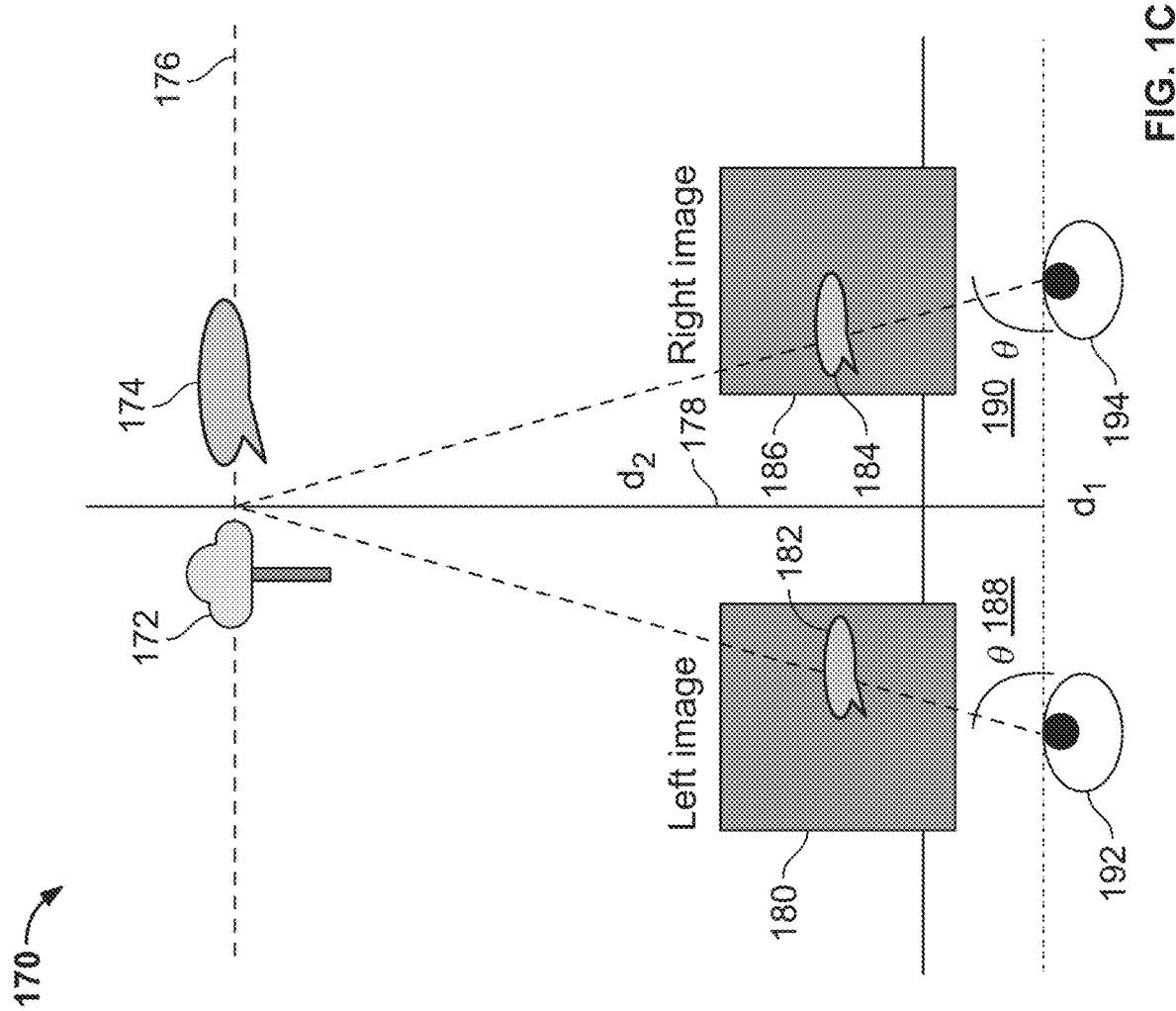
FIG. 1C shows another exemplary implementation of augmented reality image generation, in accordance with some embodiments of this disclosure.

FIGS. 1B and 1C show exemplary implementations of systems 130 and 170 of augmented reality image generation, in accordance with some embodiments of this disclosure. Similar to FIG. 1A, system 130 may have an AR display device with two screen 146 and 148 for two eyes 150 and 152. Similar to FIG. 1A, system 170 may have an AR display device with two screen 180 and 186 for two eyes 192 and 194.

In some embodiments, such as system 130, the AR application of the AR system may capture an image of a physical environment (e.g., comprising images of real mountains 136, trees, 138 and house 140). The AR application may then identify an object in the captured image to serve as an anchor point. For example, an AR application may perform object detection with surfaces suitable of virtual object insertion. For example, an AR application may identify the objects using techniques described in Grasset, et al.'s "Image-Driven View Management for Augmented Reality Browsers," (2012 IEEE International Symposium on Mixed and Augmented Reality (ISMAR), 2012, pp. 177-186) which is incorporated by reference herein. For example, an AR application may analyze the captured image to produce a set of visually salient objects into which the virtual content can be rendered. An AR system may also identify background textures in real-world scenes that would make virtual content easy to read. For example, such textures may be identified by techniques described in Leykin and Tuceryan's "Automatic Determination of Text Readability over Textured Backgrounds for Augmented Reality Systems," (Third IEEE and ACM International Symposium on Mixed and Augmented Reality, 2004, pp. 224-230) which is incorporated by reference herein.

In some embodiments, the anchor object (e.g., one of objects 140, 138, 136) may be identified based on database which list selected objects in the real world for virtual content insertion (e.g., know billboards, flat walls, large mountain). In some embodiments, the anchor object may be identified based on request to insert supplemental content into certain real world contort. For example, the AR system any have access to an advertisement that lists which objects are suitable for ad insertion. For example, a flat side of a big truck may be identified as suitable anchor object for car advertisment. In this approach, the AR application may identify qualities of identified object (e.g., using object qualities database) and match them to ad-request keywords.

The AR system also identifies a virtual object associated with the anchor point. For example, the virtual object may be selected from a database of virtual objects that matches qualities of the selected anchor object. For example, the identified virtual object may be a textual, graphic or video content item (e.g., an ad) that matches identified qualities of the anchor object. In another example, the identified virtual object may be textual description or label of the anchor object (e.g., virtual object 142 may be a name label "Matterhorn" for mountain 136). In another embodiment, a virtual object may be a shopping link (e.g. a link related to metadata of object 136). For example, it may be a link to a website that offers an option to buy a replica of the Matterhorn mountain.

In one approach, the AR application may then generate for display an apparent composite image 142 using one or more or more of displays 146 and 148 such that composite image 142 appears overlaid over the selected anchor object (e.g., mountain 136), e.g., as shown in apparent view 154. In an approach shown in FIG. 1B, virtual image 142 appears at apparent content plane 142. In some embodiments, view 154 is a composite view of real environment see-through transparent display 146, 148. In some embodiments, the view 154 is generated by AR application that captures an image of the physical environment and renders it as VST image 154 with addition of the virtual object 142 overlaid over object 136.

As a further improvement, an AR application may determine the distance of mountain 136 from AR display device or from eyes of the user. In one approach, an AR application may analyze data captured by two cameras of the AR display device and determine the distance using parallax calculation using the difference in appearance of object 136 from two viewpoints. In this approach, an AR display device may comprise two or more camera or have access to two or more external cameras. In another approach, the AR display device may comprise a light (e.g., laser) transmitter and detector. In this case, the AR display device may range the object 136 by computing timing of a signal reflected from the identified object. In another approach, the AR application may use any other suitable ranging imaging technique (e.g., detecting an object of known size like a human and proportionally computing size of other objects).

As shown in FIG. 1C, a distance to real world object 172 may be measured as value $d_2$ 178. Once the distance 178 is computed, the AR application may generate two separate images 182 and 184 of virtual object 174 for separate respective displays 180 and 186 while accounting for assumed or measured distance between eyes 192 and 194. The AR display device may generate for display two separate images 182 and 184 to create a composite image 174 (e.g., when separate images are seen by eyes 192, 194). The composite image may be generated such that apparent distance of the virtual object 174 of the composite image of the first separate image 182 and the second separate image 184 is set to the calculated distance ($d_2$) 178 between the identified object and the AR display device (or eyes 192, 194). In this way when angles 188 and 190 of eyes 192, 194 correspond to object 172, virtual object 174 will also appear on the same vergence plane 176 and will be easy to see.

Object 172 of system 170 may be considered a real object, e.g., as viewed by a user through an AR device. In some embodiments, object 172 is a real object seen through see-through glass display 180, 186. In some embodiments, object 172 is an image of real object generated on VST displays 180, 186. In some embodiments, the process of insertion a virtual object in association with anchor objects may be repeated for other anchor objects. For example, the AR application may identify a second virtual object associated with house 140. The AR application will measure the distance to house 140 and create two separate images of the second virtual object such that the composite image of the second appears at the same apparent distance as the house 140 (which is different from apparent distance of object 172). The second composite image and the composite image 176 may be generated for display simultaneously at different apparent distances (e.g., at different distances corresponding to how far away house 104 and mountain 136 are).

Figure 2:
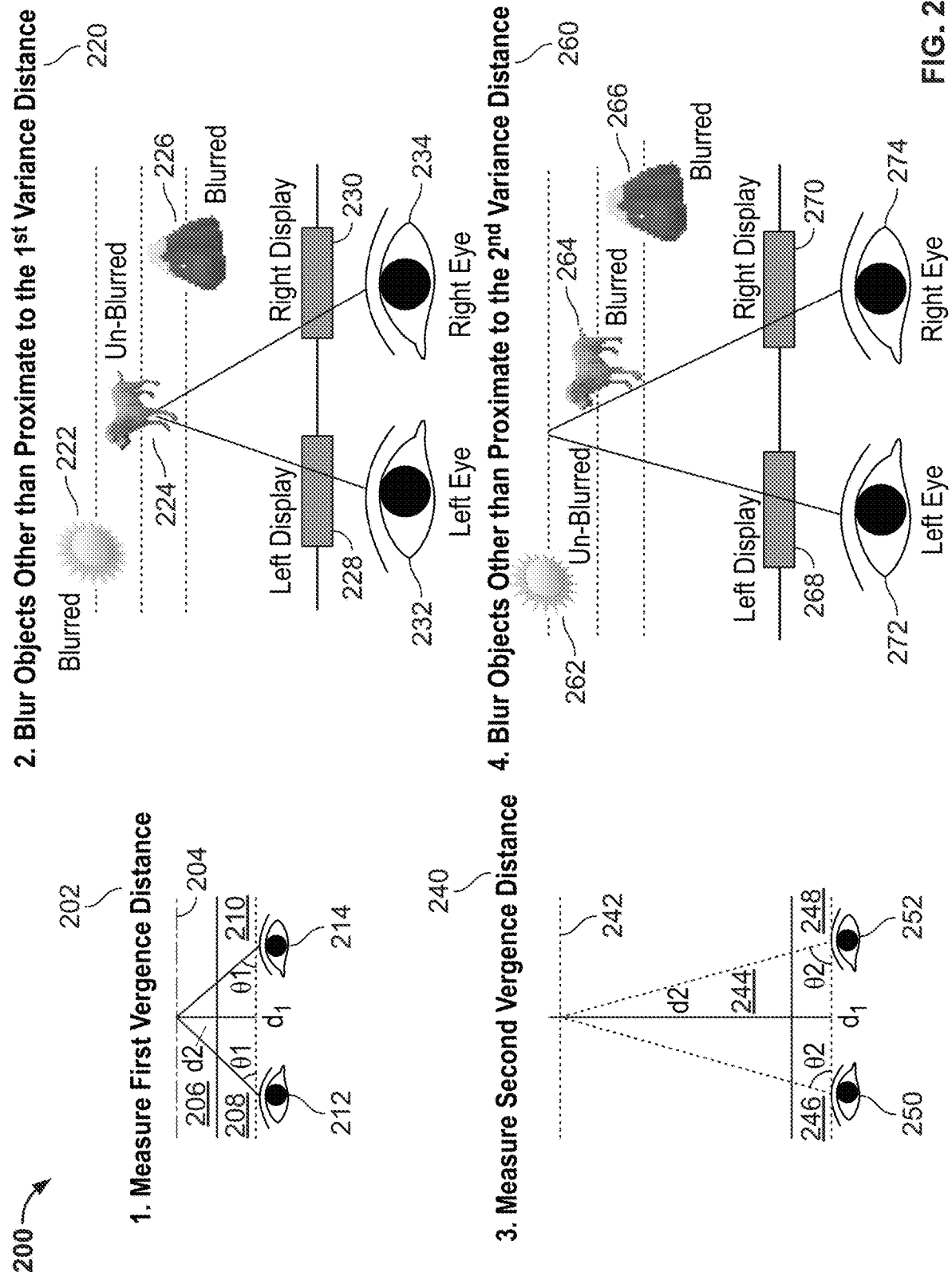
FIG. 2 shows an exemplary implementation of augmented reality image generation with selective blurring, in accordance with some embodiments of this disclosure.

FIG. 2 shows an exemplary implementation 200 of augmented reality image generation with selective blurring, in accordance with some embodiments of this disclosure. In some embodiments, techniques of implementation 200 are performed using an AR application of the AR display device (e.g., as described above and below) that performs VST AR display functions. For example, the AR application may capture an image of a physical environment (e.g. environment comprising object 222, 224, 226) and display the captured image on displays 228 and 230 (and/or on display 268 and 270 which may be the same displays) to create a VST image.

The display image of the physical environment generated by the AR application may be adjusted to achieve perception of selective focus of objects in the AR display based on e.g., a biometric measurement of user's eyes. This way, for instance, the VST image emulates the way focus works in real life: when a user focuses on objects close to them, other more distant objects appear out of focus, and likewise when we focus on far away objects, near objects appear blurry. A more natural-feeling effect like this is typically lost in conventional VST displays.

To achieve this effect the AR application identifies 202 dynamic user's vergence plane based on biometric information of a user of the AR display device. For example, the AR device may have a camera or cameras pointed towards a user's eyes. The AR application can use the image to measure rotation angles 208 and 210 of the user's eyes. The system can also measure or assume distance ($d_1$) between the user's eyes. Using this information, the AR system may compute distance 206 ($d_2$) of user's dynamic vergence plane 204 at which the user's eyes are currently directed. For example, the AR application may measure the distance of the user's dynamic vergence plane away from the user's eyes (or from the AR device) based on techniques described in De Luca, M., Spinelli, D., Zoccolotti, P., and Zeri, F. (2009) "Measuring Fixation Disparity with Infrared Eye Trackers." PubMed DOI: 10.1117/1.3077198 and Duchowski, A., Pelfrey, B., House, D., and Wang, R. (2011). "Measuring Eye Gaze Depth with an Eye Tracker During Stereoscopic Display." SIGRRAPH 2011, each of which is incorporated by reference herein.

The AR system captures an image of a physical environment. The system identifies objects in the physical environment (e.g., objects 222, 224 and 226). This can be done, for example, using object detection techniques described above with relation to FIGS. 1A-1C. The system may also identify virtual objects inserted into the VST image. For example, in some embodiments any or all of the objects 222, 224 and 226 may be virtual objects. The system then determines distance of the objects 222, 224, and 226 from the displays 228, 230 (or from user's eyes 232, 232). For physical objects, techniques used above may be implemented. For virtual objects, the AR application may access insertion metadata for the object to determine a corresponding distance.

The AR system divides the real and virtual objects into two sets, the first set comprising objects proximate to the user's dynamic vergence plane 204 (e.g., object 224) and the second set comprising objects not proximate to user's dynamic vergence plane 204. In one approach, an object is considered proximate if any part of it intersects the user's dynamic vergence plane 204. In another approach, an object is considered proximate if its center part intersects the user's dynamic vergence plane 204. In another approach, an object is considered proximate if it is within a proximity threshold the dynamic user's vergence plane (e.g., if it is located within two planes that are parallel to the dynamic user's vergence plane and offset and by a pre-set or dynamic distance). A threshold distance may either be pre-set or be dynamic (e.g., based on size of an object).

The AR system may then modify the captured image to apply a blur filter 220 to the identified subset of the plurality of objects (both images or real objects and images and virtual objects) that are not proximate to the dynamic user's vergence plane. At the same time the identified subset of the plurality of objects (both images or real objects and images of virtual objects) that are proximate the dynamic user's vergence plane are not blurred. The AR application may then generate for display the modified image (e.g. using displays 228, 230) such that proximate subset (e.g., image 224) is unblurred while the non-proximate subset (e.g., images 222 and 226) are blurred.

When the user's eyes rotate the process may be repeated. For example, the AR system may measure 240 second vergence distance 244 of new user's dynamic vergence plane 242 based on new angles 246, 248 of eyes 250, 252. As a result, the AR application may blur 260 objects (real and/or virtual) proximate to different vergence distance 244. For example, displays 268, 270 for eyes 272, 275 may be used to generate for display the modified image (e.g. using displays 268, 270) such that proximate subset (e.g., image 262) is unblurred while the non-proximate subset (e.g., images 264 and 266) are blurred.

In some embodiments, this effect may be used in combination with technique(s) described in FIGS. 1A-1C. For example, after a virtual object or objects are placed next to their anchor or anchors, the blur effect can be applied based on measured distance to dynamic user's vergence plane. In some embodiments, techniques of FIG. 2 may be applied to see-through AR displays. In this case, the blur effect may be applied only to virtual objects inserted into the AR view.

In some embodiments, the blur effect may be applied differently to different objects. For example, objects further away from dynamic user's vergence plane may be blurred more than objects closer to the dynamic user's vergence plane. In another example, objects further to left or right from the eyes' midpoint may also be blurred more than objects closer to the eyes' midpoint.

FIG. 3 shows an exemplary implementation 300 of augmented reality image generation with a virtual object that remain at dynamic user's vergence distance, in accordance with some embodiments of this disclosure.

In some embodiments, techniques of implementation 300 are performed using an AR application of the AR display device (e.g., as described above and below) that performs VST AR display functions or see-through display functions. For example, the AR application may capture an image of a physical environment and display the image on displays 328 and 334 (and/or on displays 364 and 370 which may be the same displays). In some embodiments, displays 328, 334 and 364, 370 are see-through displays.

An AR application identifies a virtual object that is to remain at dynamic user's vergence distance from an AR display device or from a user's eyes. For example, the virtual object may be a system notification, a warning, an alert (e.g., amber alert received via cellular network). In some embodiments, a virtual object may be a message meeting certain criteria (e.g., a message from another user that was previously marked as relevant, or message including emergency keywords such as "help"). In some embodiments, the virtual object may be a newly inserted supplemental content (e.g., anchored to one of the real objects as described in FIGS. 1A-1C). In some embodiments, the virtual object may be a game object marked with metadata as relevant by a game application.

The AR application may measure 302 first vergence distance 306 of user's dynamic vergence plane 304 based on angles 308, 310 of eyes 312, 314. The AR application may then provide display 320, the identified virtual object 324 at apparent distance 326 that is equal to computed distance 306. This may be achieved by placing separate imaged 330 and 332 on displays 328, 334 such that when viewed by eyes 336, 338 the composite image appears at distance 326 of vergence plane 322 that is equivalent to distance of vergence plane 304.

When a user's eyes rotate, the AR application may measure 340 second vergence distance 346 of user's dynamic vergence plane 342 based on new angles 348, 350 of eyes 352, 354. The AR application may then display 360, the identified virtual object 362 (e.g., same as object 324) at apparent distance 300 that is equal to the new computed distance 346. This may be achieved by placing separate imaged 366 and 368 on displays 364, 370 such that when viewed by eyes 372, 374 the composite image appears at distance 346 of verge plane 362 that equivalent to distance of vergence plane 342.

This effect may be repeated for object 324 for a certain time period (e.g., 3 second, or 5 seconds) to keep changing the apparent distance of identified object 324 (e.g., from user's eyes or from AR display device) to match the user's changing dynamic vergence plane (e.g., as determined by biometric sensors of the AR display device). The time period may be preset. In another approach, the time period may be dynamic and based one or more factors such as, context of the scene (e.g., metadata of object sin the scene), level of relevance of the message, metadata of the identified object. If the identified object comprises advertisement, the time period may depend on service tier at which the advertainment is purchased (e.g. more money may be charged to keep the ad at user's dynamic vergence distance longer).

In some embodiments, this effect may be combined with one or more of the techniques described in FIGS. 1A-C and 2. For example, the identified object may be inserted in addition to anchored virtual objects of FIGS. 1A-1C. When an identified object is inserted into a scene to which the blur effect of FIG. 2 is applied, the identified object will not need to be blurred because it will be displayed at apparent distance from the AR device (or user's eyes) that matches the distance of the user's dynamic vergence plane form the AR device (or user's eyes).

Figure 4A:
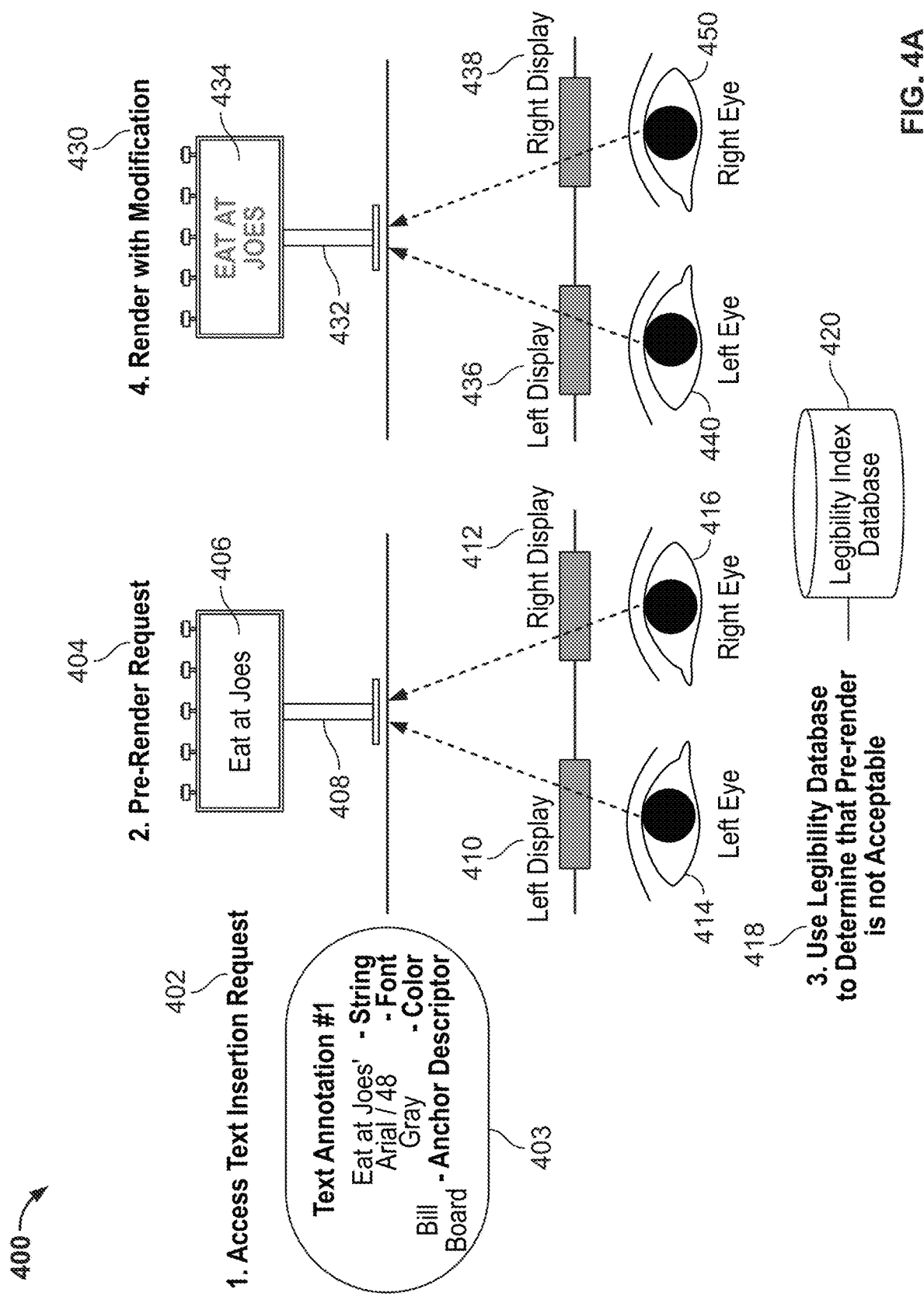
FIG. 4A shows an exemplary implementation of augmented reality image generation with inserted textual item, in accordance with some embodiments of this disclosure.

FIG. 4A shows an exemplary implementation 400 of augmented reality image generation with inserted textual item, in accordance with some embodiments of this disclosure.

In some embodiments, techniques of implementation 400 are performed using an AR application of the AR display device (e.g., as described above and below) that, e.g., performs VST AR display functions or see-through display functions. For example, the AR application may capture an image of a physical environment and display the image on displays 410 and 412 (and/or on displays 440 and 450 which may be the same displays). In another embodiment, displays 410, 412 and 440, 450 are see-through displays.

Human visual perception system has been extensively studied to better understand legibility of text at a distance. This research has resulted in everyday guidelines such as required size of lettering on highway signage, governed by the need for these signs to be legible at a given distance. For example, at a distance of 50 meters, a letter needs to have roughly a 2-meter height in order to be legible, but this scales down as distance decreases.

The results of such research may be stored in database 420 that defines a legibility score based on variety of criteria. A base legibility score may be computed based on distance to the text divided by height. However, the legibility score may be further modified by a variety of factors such as font, color of the text, lighting conditions, whether the text is in positive space or negative space, color and texture of the background, etc. As an example, text in Helvetica font displayed as black text on a white background, and in perfect lighting conditions may have legibility score of 29. Accordingly, the minimum character height at which it should be rendered at a distance of 100 feet should be 3.5 inches (e.g., computed by 100/29). Legibility scores may be any other suitable score that may be used to determine if the text is readable or not.

In some embodiments, the legibility score may be computed as described by United States Sign Council (1998), "Sign Legibility, Overview and Calculation Methodology," or by Cai and Green (2008), "The Legibility Index for Examining Common Viewing Situations," each of which is incorporated herein by reference.

In some embodiments, the AR application may query database 420 (e.g., local or remote database) with conditions of the text and/or of the environment (e.g., size of the text, distance, font, color of the text, texture, lighting condition etc.), and the database may return the legibility score.

At step 402 off implementation 400, the AR system may access an instruction to insert a text item into an AR environment in association with an anchor object in a physical environment. For example, the text item may be a virtual object that is to be inserted into an AR environment in association with anchor object in the physical environment. Such a virtual object may be selected as described in description of FIGS. 1A-1C. For example, the text item may be a description of the anchor object, or a supplemental content (e.g., ad or descriptive material to the anchor object).

In some embodiments, the request may comprise textual properties 403 of the text item. For example, textual properties 403 may include a message of the text item (e.g., "Eat at Joes!"), an optional alternative shorter text (e.g., "Joes!"), font, font size, prefer color, text texture, metadata of the proffered anchor (e.g., indication that the text item should be displayed on a billboard or on a mountain), any other textual properties, or any combination of the above. The appropriate anchor point may be identified based on capturing an image of the physical evolvement and performing visual analysis of the image (e.g., as described in relation to FIGS. 1A-1C). For example, billboard 408 may be selected as an anchor based on its description (e.g., generated by AI vision techniques) matching the anchor description in the textual properties 403. The request may be received from a user (e.g., user interactive request may receive via a user interface to provide textual description of objects) by an application, a remote server (e.g., an ad server). Some of the textual properties 403 may be marked as loose (e.g., may be relaxed at render time) or strict (e.g., may not be relaxed at render time).

At step 404, the AR application may pre-render the text item over the identified anchor. For example, the AR application may generate an image that includes the image of physical environment with textual item 406 (e.g., text "eat at joes") inserted over the anchor point 408 as requested. The system may then analyze the pre-rendered image for legibility. In one approach, virtual object 406 may be pre-rendered to appear at a user's vergence plane at the same apparent distance at the distance of anchor object 408 from the AR display device (or form the user's eyes). For example, this may be accomplished by creating separate pre-rendered image for displays 410, 412 for eyes 414, 416 that would make text item 406 appear at vergence plane of anchor object 408 (e.g., as described in relation FIGS. 1A-1C).

In one approach, the AR application may query 418 the database 420 to determine if the text 406 is legible for eyes 414, 416. The query may specify all or some textual properties 403 as well as all or some determined visual properties of background of anchor object. The query may also specify a measured lighting conditions (e.g., measured with a camera of AR display device). These properties may be determined by computer vision analysis of the image of physical environment. The query may also specify distance of the user's eyes or AR displays to the item. Database 420 may then return a legibility score that is based on those inputs.

If the legibility score is acceptable (e.g., if it meets or exceeds a legibility threshold), the AR system may generate the pre-rendered image for display on displays 410, 412. If the legibility score is not acceptable (e.g., if it fails to meet or exceed a legibility threshold), the AR system may modify some or all textual properties of the text item. For example, the AR system may modify text size, font, color, or even use substitute text instead of original text. For instance, at 430 the AR system may have modified the size and font and texture of the text item, 434 (e.g., modified item 460) to be displayed in association with anchor object 43.2 (e.g., same as anchor 408). Additionally, or alternatively, the AR application may also modify the anchor object itself (e.g., if the VST AR device is used). Additionally, or alternatively, the AR application may also modify lighting conditions (e.g., by applying a lighting filter if the VST AR device is used). In some embodiments, the modification may be constrained by limits in the request 403 (e.g., the ad server may seek to maintain certain branded font).

A newly modified pre-rendered image 432 may be once again checked for legibility using database 420. If the legibility score is acceptable (e.g., if it meets or exceeds a legibility threshold), the AR system may generate the pre-rendered image for display on displays 436, 438 (e.g., same as displays 410, 412). If the legibility score is not acceptable, the AR application may continue making adjustment to textual properties of item 406, and/or to properties of anchor point 408, and/or lighting conditions until the text is deemed to be legible or until no further improvement may be achieved within specified constraints. As shown, item 434 increases the text size from 48 to 64 and changed the text font from Arial to Algerian font to improve legibility.

In some embodiments, if no further improvement to the legibility may be achieved within specified constraints, the AR application may return an error message and not render the text item in AR environment. In some embodiments, if no further improvement may be achieved within specified constraints, the AR application may generate for display the best possible version of the text item.

In some embodiments, the above techniques may also be used to improve legibility of physical text in physical environment. For example, text 406 may be physical text printed on billboard 408. The AR application may determine that text 406 is not legible. In response, the scanned text 406 may be treated as a virtual item that needs to be reinserted into the VST of the physical environment. The system may then perform step 430 to render a modified version of text 406 into anchor point 432.

In some embodiments, techniques of FIGS. 4A-4E may be performed without an anchor object. For example, object 406 may be inserted into background of the AR environment instead of over any particular real or virtual anchor object. In this approach, the AR application access an instruction to insert a text item into Augmented Reality (AR) environment, and pre-renders it over some suitable background (e.g., in the area not obscuring other relevant objects). The AR application then computes the legibility score based on textual properties of the text item, image properties of the background, and distance of the background to an AR display device. In response to determining that the legibility score is below a threshold legibility score, the AR application adjusts one or more of the textual properties of the text item and/or of the background. The adjustments may be same as shown in FIGS. 4A-4E. The adjustment may be repeated until appropriate legibility is achieved. Then, object 406 is generated for display on the AR display device over a background.

In some embodiments, the above techniques may be performed in combination with techniques of FIGS. 1-3. For example, selective blurring (as described in relation to FIG. 2) may be added (with legibility requirement removed for blurred items). In another example, the legibility changes may be applied to a virtual object that is set to remain at dynamic user's vergence distance from an AR) display device (as describe in relation to FIG. 3).

In some embodiments, the steps 404 may be repeated when the AR device moves (e.g., farther or closer to the anchor point 406). In some embodiments, the text item 406 may then be re-rendered in a best possible way for best legibility. In some embodiments, the text item 406 may retain some of the properties from previous renders to preserve continuity. For example, if the font was changed from Arial to Algerian, the Algerian font may be maintained even if it is no longer needed for legibility. In other examples, similar preservation of continuity may apply to font color, background color, or to text replacement. e.g., if "Eat at Joes!" was changed to "Joes," the shorter text may remain even if no longer needed for legibility.

FIG. 4B-4E show other exemplary implementation of augmented reality image generation with inserted textual item, in accordance with some embodiments of this disclosure.

FIG. 4B shows replacement of textual item "Eat at Joes" with shorter modified text item 472 "Joes" at anchor 474. The shorter version may be specified in the request 403 or procedurally generated. FIG. 4C shows increase in size of both anchor 478 and modified text item 476. The increase in size of anchor 478 may be achieved by using image editing technique to remove anchor 408 from a captured image of the physical environment, and re-insert scaled-up version of anchor 478 as a virtual object in a VST image generated by the AR application.

FIG. 4D shows a change in background color of anchor 480. The change of color of anchor 480 may be achieved by using image editing technique to modify anchor 408 in a VST image generated by the AR application. As shown, another technique to increase legibly may be to present textual item 482 as negative space on darker background of modified anchor object 480.

FIG. 4E shows an increase in lighting level of anchor object 486 and text item 488. For example, the AR application may insert a new light source 484 in the VST image generated by the AR application. The AR application may then apply brightening filter to anchor object 486 and text item 488, and optionally insert shadows that we created by insertion of light source 484 as virtual objects in the VST image. Modifications shown in FIGS. 4A-4E may be used in any combination with each other, e.g., to attempt to increase legibility of text item 404 (e.g., as part of gradual pre-renders described in step 430).

Figure 6:
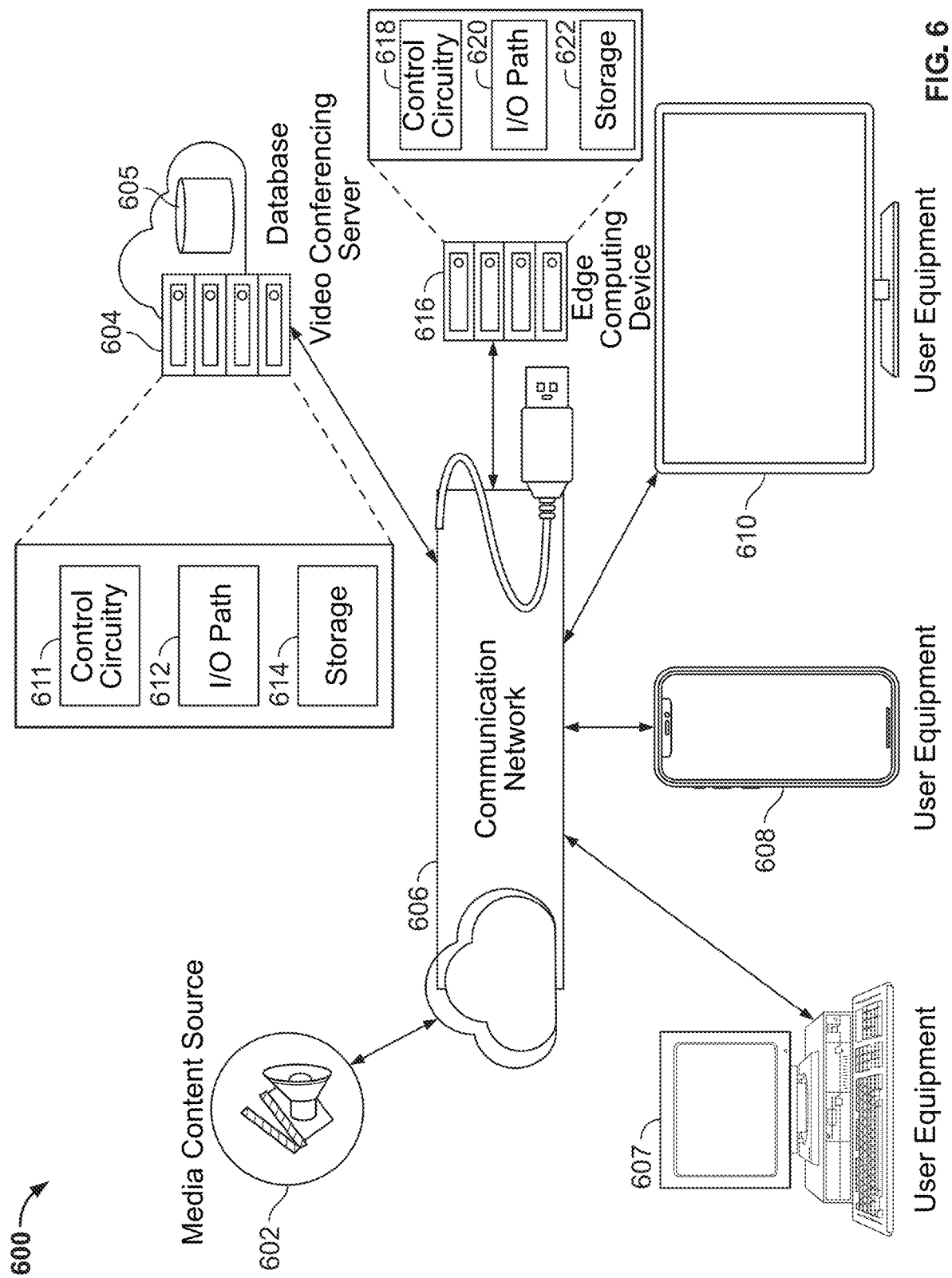
FIG. 6 shows a system, in accordance with some embodiments of this disclosure.

FIGS. 5-6 describe illustrative devices, systems, servers, and related hardware for AR generation. FIG. 5 shows generalized embodiments of illustrative user equipment devices 500 and 501, which may correspond to, e.g., computing devices 212, 260, 312, and 314. For example, user equipment device 500 may be a smartphone device, a tablet, a virtual reality or augmented reality device, or any other suitable device capable of processing video data. In another example, user equipment device 501 may be a user television equipment system or device. User television equipment device 501 may include set-top box 515. Set-top box 515 may be communicatively connected to microphone 516, audio output equipment (e.g., speaker or headphones 514), and display 512. In some embodiments, display 512 may be a television display or a computer display. In some embodiments, set-top box 515 may be communicatively connected to user input interface 510. In some embodiments, user input interface 510 may be a remote-control device. Set-top box 515 may include one or more circuit boards. In some embodiments, the circuit boards may include control circuitry, processing circuitry, and storage (e.g., RAM, ROM, hard disk, removable disk, etc.). In some embodiments, the circuit boards may include an input/output path.

Each one of user equipment device 500 and user equipment device 501 may receive content and data via input/output (I/O) path 502 that may comprise I/O circuitry (e.g., network card, or wireless transceiver). I/O path 502 may provide content (e.g., broadcast programming, on-demand programming, Internet content, content available over a local area network (LAN) or wide area network (WAN), and/or other content) and data to control circuitry 504, which may comprise processing circuitry 506 and storage 508. Control circuitry 504 may be used to send and receive commands, requests, and other suitable data using I/O path 502, which may comprise I/O circuitry. I/O path 502 may connect control circuitry 504 (and specifically processing circuitry 506) to one or more communications paths (described below). I/O functions may be provided by one or more of these communications paths, but are shown as a single path in FIG. 5 to avoid overcomplicating the drawing. While set-top box 515 is shown in FIG. 6 for illustration, any suitable computing device having processing circuitry, control circuitry, and storage may be used in accordance with the present disclosure. For example, set-top box 515 may be replaced by, or complemented by, a personal computer (e.g., a notebook, a laptop, a desktop), a smartphone (e.g., device 600), a tablet, a network-based server hosting a user-accessible client device, a non-user-owned device, any other suitable device, or any combination thereof.

Control circuitry 504 may be based on any suitable control circuitry such as processing circuitry 506. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 504 executes instructions for the AR application stored in memory (e.g., storage 508). Specifically, control circuitry 504 may be instructed by the AR application to perform the functions discussed above and below. In some implementations, processing or actions performed by control circuitry 504 may be based on instructions received from the AR application.

In client/server-based embodiments, control circuitry 504 may include communications circuitry suitable for communicating with a server or other networks or servers. The AR application may be a stand-alone application implemented on a device or a server. The AR application may be implemented as software or a set of executable instructions. The instructions for performing any of the embodiments discussed herein of the AR application may be encoded on non-transitory computer-readable media (e.g., a hard drive, random-access memory on a DRAM integrated circuit, read-only memory on a BLU-RAY disk, etc.). For example, in FIG. 5, the instructions may be stored in storage 508, and executed by control circuitry 504 of a device 500.

In some embodiments, the AR application may be a client/server application where only the client application resides on device 500 (e.g., device 104), and a server application resides on an external server (e.g., server 604 and/or server 616). For example, the AR application may be implemented partially as a client application on control circuitry 504 of device 500 and partially on server 604 as a server application running on control circuitry 611. Server 604 may be a part of a local area network with one or more of devices 500 or may be part of a cloud computing environment accessed via the internet. In a cloud computing environment, various types of computing services for performing searches on the internet or informational databases, providing AR generation, providing storage (e.g., for a database) or parsing data (e.g., using machine learning algorithms described above and below) are provided by a collection of network-accessible computing and storage resources (e.g., server 604 and/or edge computing device 616), referred to as "the cloud." Device 600 may be a cloud client that relies on the cloud computing capabilities from server 604 to determine whether processing (e.g., at least a portion of virtual background processing and/or at least a portion of other processing tasks) should be offloaded from the mobile device, and facilitate such offloading. When executed by control circuitry of server 604 or 616, the AR application may instruct control 611 or 618 circuitry to perform processing tasks for the client device and facilitate the AR generation.

Control circuitry 504 may include communications circuitry suitable for communicating with a server, edge computing systems and devices, a table or database server, or other networks or servers The instructions for carrying out the above mentioned functionality may be stored on a server (which is described in more detail in connection with FIG. 6). Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communication networks or paths (which is described in more detail in connection with FIG. 6). In addition, communications circuitry may include circuitry that enables peer-to-peer communication of user equipment devices, or communication of user equipment devices in locations remote from each other (described in more detail below).

Memory may be an electronic storage device provided as storage 508 that is part of control circuitry 504. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 508 may be used to store various types of content described herein as well as AR application data described above (e.g., database 420). Nonvolatile memory may also be used (e.g., to launch a boot-up routine and other instructions). Cloud-based storage, described in relation to FIG. 5, may be used to supplement storage 508 or instead of storage 508.

Control circuitry 504 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 504 may also include scaler circuitry for upconverting and downconverting content into the preferred output format of user equipment 500. Control circuitry 504 may also include digital-to-analog converter circuitry and analog-to-digital converter circuitry for converting between digital and analog signals. The tuning and encoding circuitry may be used by user equipment device 500, 501 to receive and to display, to play, or to record content. The tuning and encoding circuitry may also be used to receive video AR generation data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 508 is provided as a separate device from user equipment device 500, the tuning and encoding circuitry (including multiple tuners) may be associated with storage 508.

Control circuitry 504 may receive instruction from a user by way of user input interface 510. User input interface 510 may be any suitable user interface, such as a remote control, mouse, trackball, keypad, keyboard, touch screen, touchpad, stylus input, joystick, voice recognition interface, or other user input interfaces. Display 512 may be provided as a stand-alone device or integrated with other elements of each one of user equipment device 500 and user equipment device 501. For example, display 512 may be a touchscreen or touch-sensitive display. In such circumstances, user input interface 510 may be integrated with or combined with display 512. In some embodiments, user input interface 510 includes a remote-control device having one or more microphones, buttons, keypads, any other components configured to receive user input or combinations thereof. For example, user input interface 510 may include a handheld remote-control device having an alphanumeric keypad and option buttons. In a further example, user input interface 510 may include a handheld remote-control device having a microphone and control circuitry configured to receive and identify voice commands and transmit information to set-top box 515.

Audio output equipment 514 may be integrated with or combined with display 512. Display 512 may be one or more of a monitor, a television, a liquid crystal display (LCD) for a mobile device, amorphous silicon display, low-temperature polysilicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 512. Audio output equipment 514 may be provided as integrated with other elements of each one of device 500 and equipment 501 or may be stand-alone units. An audio component of videos and other content displayed on display 512 may be played through speakers (or headphones) of audio output equipment 514. In some embodiments, audio may be distributed to a receiver (not shown), which processes and outputs the audio via speakers of audio output equipment 514. In some embodiments, for example, control circuitry 504 is configured to provide audio cues to a user, or other audio feedback to a user, using speakers of audio output equipment 514. There may be a separate microphone 516 or audio output equipment 514 may include a microphone configured to receive audio input such as voice commands or speech. For example, a user may speak letters or words that are received by the microphone and converted to text by control circuitry 504. In a further example, a user may voice commands that are received by a microphone and recognized by control circuitry 504. AR display device 518 may be any suitable AR display device (e.g., an integrated head mountain display or AR display device connected to a system 500). In some embodiments all elements of system 500 may be places into housing of the AR display device 518. In some embodiments, AR display device 518 comprises a camera (or a camera array) 556. Video cameras 556 may be integrated with the equipment or externally connected. One or more of cameras 556 may be a digital camera comprising a charge-coupled device (CCD) and/or a complementary metal-oxide semiconductor (CMOS) image sensor. One or more of cameras 556 may be an analog camera that converts to digital images via a video card. In some embodiments, one or more of cameras 556 may be dirtied at outside physical environment (e.g., two cameras may be pointed out to capture to parallax views of the physical environment). In some embodiments, one or more of cameras 556 may be pointed at user's eyes to measure their rotation to be used as biometric sensors. In some embodiments, AR display device 518 may comprise other biometric sensor or sensors to measure eye rotation (e.g., electrodes to measure eye muscle contractions). AR display device 518 may also comprise range image 554 (e.g., LASER or LIDAR) for computing distance of devices by bouncing the light of the objects and measuring delay in return (e.g., using cameras 556). In some embodiments, AR display device 518 comprises left display 550, right display 550 (or both) for generating VST images, or see-through AR images in accordance with embodiments in FIGS. 1-4.

The AR application may be implemented using any suitable architecture. For example, it may be a stand-alone application wholly-implemented on each one of user equipment device 500 and user equipment device 501. In such an approach, instructions of the application may be stored locally (e.g., in storage 508), and data for use by the application is downloaded on a periodic basis (e.g., from an out-of-band feed, from an Internet resource, or using another suitable approach). Control circuitry 504 may retrieve instructions of the application from storage 508 and process the instructions to provide AR generation functionality and preform any of the actions discussed herein. Based on the processed instructions, control circuitry 504 may determine what action to perform when input is received from user input interface 510. For example, movement of a cursor on a display up/down may be indicated by the processed instructions when user input interface 510 indicates that an up/down button was selected. An application and/or any instructions for performing any of the embodiments discussed herein may be encoded on computer-readable media. Computer-readable media includes any media capable of storing data. The computer-readable media may be non-transitory including, but not limited to, volatile and non-volatile computer memory or storage devices such as a hard disk, floppy disk, USB drive, DVD, CD, media card, register memory, processor cache, Random Access Memory (RAM), etc.

In some embodiments, the AR application is a client/server-based application. Data for use by a thick or thin client implemented on each one of user equipment device 500 and user equipment device 501 may be retrieved on-demand by issuing requests to a server remote to each one of user equipment device 500 and user equipment device 501. For example, the remote server may store the instructions for the application in a storage device. The remote server may process the stored instructions using circuitry (e.g., control circuitry 504) and generate the displays discussed above and below. The client device may receive the displays generated by the remote server and may display the content of the displays locally on device 500. This way, the processing of the instructions is performed remotely by the server while the resulting displays (e.g., that may include text, a keyboard, or other visuals) are provided locally on device 500. Device 500 may receive inputs from the user via input interface 510 and transmit those inputs to the remote server for processing and generating the corresponding displays. For example, device 500 may transmit a communication to the remote server indicating that an up/down button was selected via input interface 510. The remote server may process instructions in accordance with that input and generate a display of the application corresponding to the input (e.g., a display that moves a cursor up/down). The generated display is then transmitted to device 500 for presentation to the user.

In some embodiments, the AR application may be downloaded and interpreted or otherwise run by an interpreter or virtual machine (run by control circuitry 504). In some embodiments, the AR application may be encoded in the ETV Binary Interchange Format (EBIF), received by control circuitry 504 as part of a suitable feed, and interpreted by a user agent running on control circuitry 504. For example, the AR application may be an EBIF application. In some embodiments, the AR application may be defined by a series of JAVA-based files that are received and run by a local virtual machine or other suitable middleware executed by control circuitry 504. In some of such embodiments (e.g., those employing MPEG-2 or other digital media encoding schemes), AR application may be, for example, encoded and transmitted in an MPEG-2 object carousel with the MPEG audio and video packets of a program.

FIG. 6 is a diagram of an illustrative system 600 for AR generation, in accordance with some embodiments of this disclosure. User equipment devices 607, 608, 610 (e.g., which may correspond to one or more of computing device 212 may be coupled to communication network 606. Communication network 606 may be one or more networks including the Internet, a mobile phone network, mobile voice or data network (e.g., a 5G, 4G, or LTE network), cable network, public switched telephone network, or other types of communication network or combinations of communication networks. Paths (e.g., depicted as arrows connecting the respective devices to the communication network 606) may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 6 to avoid overcomplicating the drawing.

Although communications paths are not drawn between user equipment devices, these devices may communicate directly with each other via communications paths as well as other short-range, point-to-point communications paths, such as USB cables, IEEE 1394 cables, wireless paths (e.g., Bluetooth, infrared, IEEE 702-11x, etc.), or other short-range communication via wired or wireless paths. The user equipment devices may also communicate with each other directly through an indirect path via communication network 606.

System 600 may comprise media content source 602, one or more servers 604, and one or more edge computing devices 616 (e.g., included as part of an edge computing system, such as, for example, managed by mobile operator 206). In some embodiments, the AR application may be executed at one or more of control circuitry 611 of server 604 (and/or control circuitry of user equipment devices 607, 608, 610 and/or control circuitry 618 of edge computing device 616). In some embodiments, data structure 300 of FIG. 3, may be stored at database 605 maintained at or otherwise associated with server 604, and/or at storage 622 and/or at storage of one or more of user equipment devices 607, 608, 610.

In some embodiments, server 604 may include control circuitry 611 and storage 614 (e.g., RAM, ROM, Hard Disk, Removable Disk, etc.). Storage 614 may store one or more databases. Server 604 may also include an input/output path 612. I/O path 612 may provide AR generation data, device information, or other data, over a local area network (LAN) or wide area network (WAN), and/or other content and data to control circuitry 611, which may include processing circuitry, and storage 614. Control circuitry 611 may be used to send and receive commands, requests, and other suitable data using I/O path 612, which may comprise I/O circuitry. I/O path 612 may connect control circuitry 611 (and specifically control circuitry) to one or more communications paths.

Control circuitry 611 may be based on any suitable control circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry 611 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 611 executes instructions for an emulation system application stored in memory (e.g., the storage 614). Memory may be an electronic storage device provided as storage 614 that is part of control circuitry 611.

Edge computing device 616 may comprise control circuitry 618, I/O path 620 and storage 622, which may be implemented in a similar manner as control circuitry 611, I/O path 612 and storage 624, respectively of server 604. Edge computing device 616 may be configured to be in communication with one or more of user equipment devices 607, 608, 610 and video server 604 over communication network 606, and may be configured to perform processing tasks (e.g., AR generation) in connection with ongoing processing of video data. In some embodiments, a plurality of edge computing devices 616 may be strategically located at various geographic locations, and may be mobile edge computing devices configured to provide processing support for mobile devices at various geographical regions.

Figure 7:
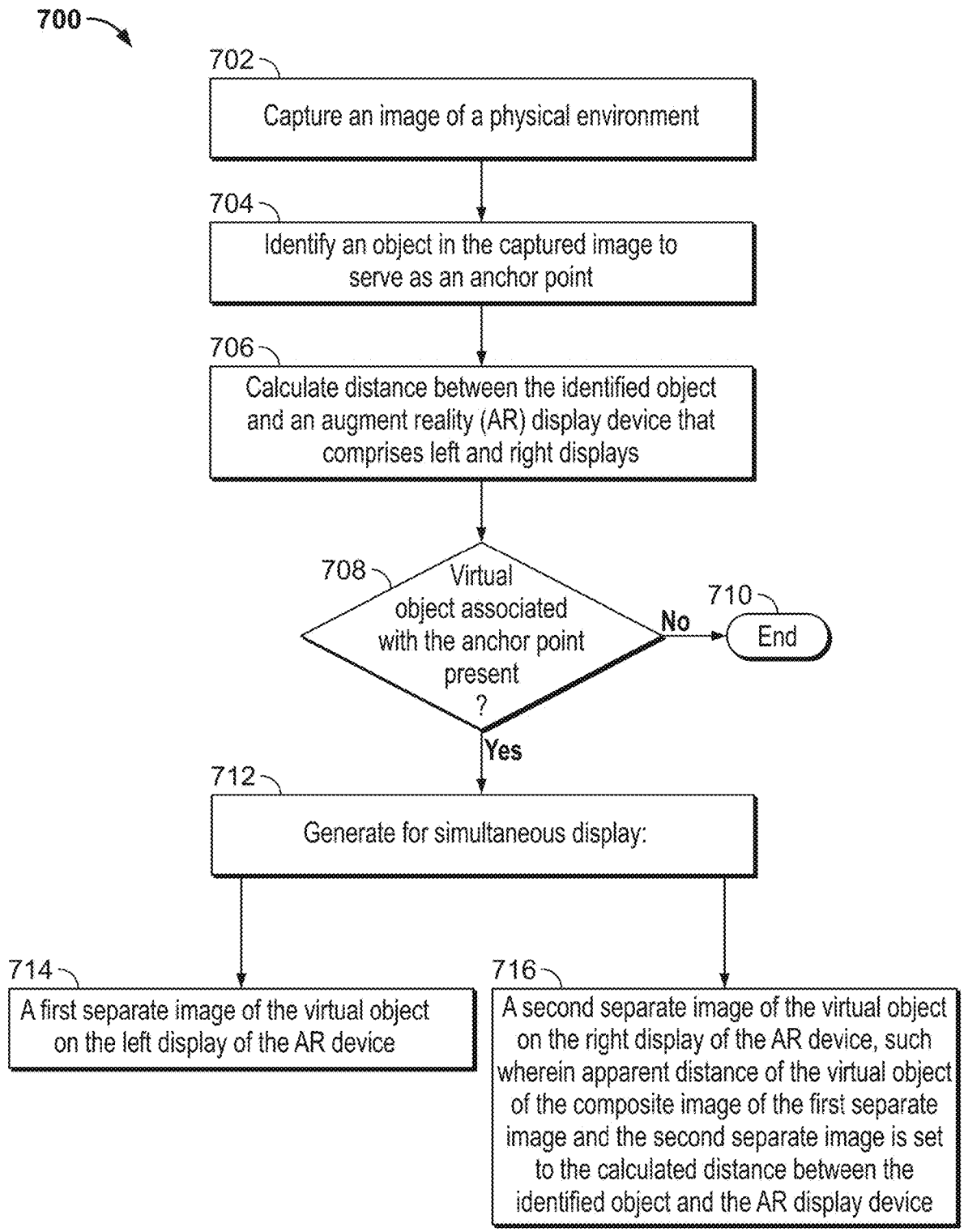
FIG. 7 is a flowchart of a detailed illustrative process for augmented reality image generation, in accordance with some embodiments of this disclosure.

FIG. 7 is a flowchart of a detailed illustrative process 700 for augmented reality image generation, in accordance with some embodiments of this disclosure. In various embodiments, the individual steps of process 700 may be implemented by one or more components of the devices and systems of FIGS. 1A-1C and 5-6.

As part of process 700, control circuitry (e.g., control circuitry 611, control circuitry 618, or control circuitry of any of devices 607, 608, or 610) may execute a series of steps to achieve generation of an AR image or video, e.g., as shown in any of FIGS. 1A-1C.

At 702, the control circuitry captures an image of a physical environment (e.g. using camera 556). At 704, the control circuitry identifies an object in the captured image to serve as an anchor. At the 706, the control circuitry measures distance to the anchor (e.g., from the AR device 518 or eyes of the user). For example, the measurement may be performed using parallax calculation using two cameras 518 or by using the ranging device 554.

At 708, the control circuitry checks if a virtual object is to be inserted in association with the anchor object. For example, the control circuitry may identify an ad from ad server 604 that matches the anchor object. In another embodiments, user request may be received via interface 620 to annotate the anchor object with textual description. If no virtual object is found, the process 700 ends. In some embodiments, process 700 may be repeated periodically or when the image of the environment captured by cameras sufficiently changes (e.g., when more objects come into view). If the virtual object is found, process 700 continues at 712.

At 712, the control circuitry generates two separate images for display at AR display device (e.g., device 518) at left display (e.g., display 550) and at right display (e.g., display 552). The simultaneous display of separate image of the virtual object result in overall display of composite image of the first separate image and the second separate image such that the apparent distance (i.e. vergence distance) of the composite image matches the calculated distance between the identified anchor object and the AR display device.

Figure 8:
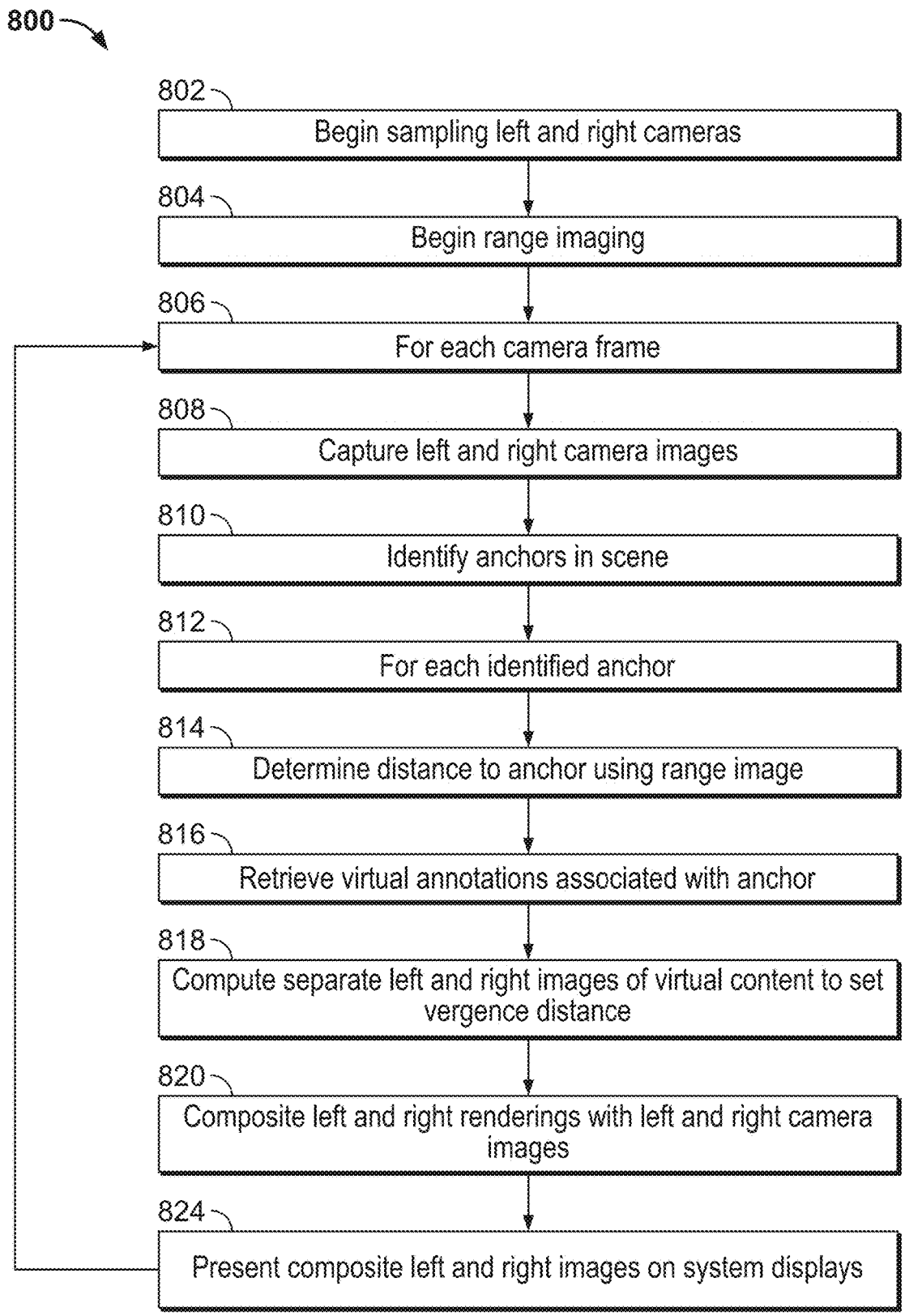
FIG. 8 shows another exemplary implementation of augmented reality image generation, in accordance with some embodiments of this disclosure.

FIG. 8 is a flowchart of a detailed illustrative process 800 for augmented reality image generation, in accordance with some embodiments of this disclosure. In various embodiments, the individual steps of process 800 may be implemented by one or more components of the devices and systems of FIGS. 1A-1C and 5-6.

As part of process 800, control circuitry (e.g., control circuitry 611, control circuitry 618, or control circuitry of any of devices 607, 608, or 610) may execute a series of steps to achieve generation of an AR image or video, e.g., as shown in any of FIGS. 1A-1C.

At step 802, the control circuitry begins sampling left and right camera (e.g., cameras 556), e.g., when AR application is launched. At step 804, the control circuitry begins range imaging (e.g., using parallax in the signals of the cameras). Steps 806-824 may then be repeated for each capture frame.

At step 808, a new capture from cameras is acquired. At step 810 the new capture is analyzed by the control circuitry to identify object that can serve as anchors (e.g., as described above in relation to FIGS. 1B-1C). Step 812-824 may then be performed for each anchor object.

At 814, distance is measured for that anchor object (e.g., using cameras 556 or range 554). At 816, virtual object (e.g., annotations are retrieved for that anchor object). At 818 separate left and right images for the annotation are computed such that the combined image would appear at vergence distance computed at step 814. The composite images are rendered for display on the left and right screens (e.g., screens 550, 554) at 820. After the presentation of the combined images at AR display device (e.g., device 518) at step 824, the process repeats for a new frame from steep 806.

Figure 9:
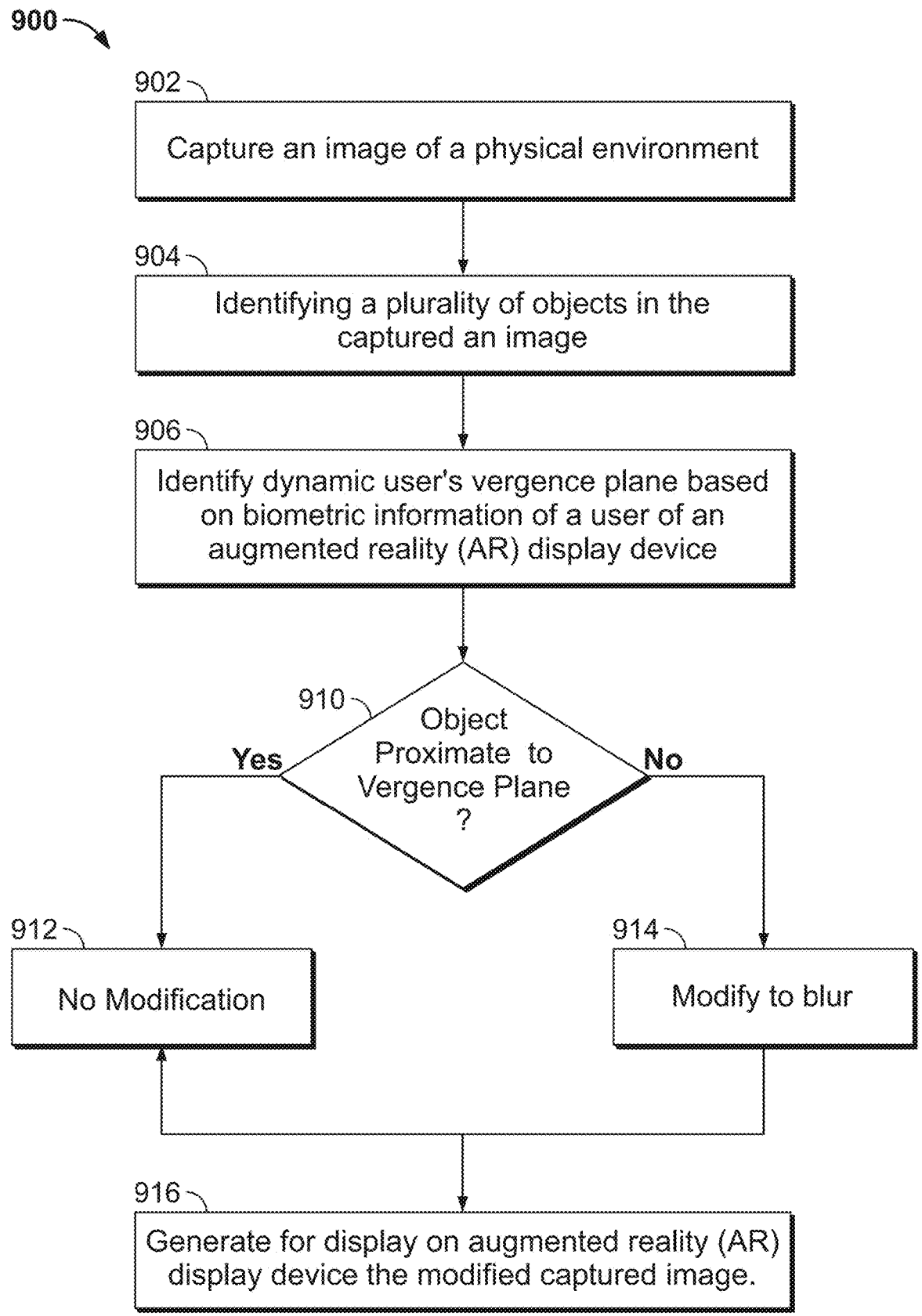
FIG. 9 is a flowchart of a detailed illustrative process for augmented reality image generation with selective blurring, in accordance with some embodiments of this disclosure.

FIG. 9 is a flowchart of a detailed illustrative process 900 for augmented reality image generation with selective blurring, in accordance with some embodiments of this disclosure. In various embodiments, the individual steps of process 900 may be implemented by one or more components of the devices and systems of FIGS. 2 and 5-6.

As part of process 900, control circuitry (e.g., control circuitry 611, control circuitry 618, or control circuitry of any of devices 607, 608, or 610) may execute a series of steps to achieve generation of an AR image or video, e.g., as shown in FIG. 2

At step 902, the control circuitry captures an image of the physical environment (e.g., using cameras 556). At 904 the control circuitry analyzes to identify objects in the image (e.g., using any suitable computer vision technique).

At step 906, the control circuitry identifies dynamic user's vergence plane based on biometric information of the user. For example, the control circuitry may use cameras 556 to capture images of user's eyes and compute a distance at which the gaze of each eyes intersects, and identify a plane parallel to plane defined by human eyes at that distance.

At step 910, for each objects that is to be displayed via VRT function of an AR display device, the control circuitry checks if that object is proximate to the dynamic user's vergence plane. Objects that are not proximate to the dynamic user's vergence plane (e.g., that do not intersect the plane or are not withing threshold distance to the plane) are blurred at step 914. While other objects (that are promiser) are not blurred 912 in a modified version of an image captured at step 902.

At step 912, the control circuitry generates the modified image on AR display device (e.g., device 518). The process may be repeated for each new frame, starting from step 902.

Figure 10:
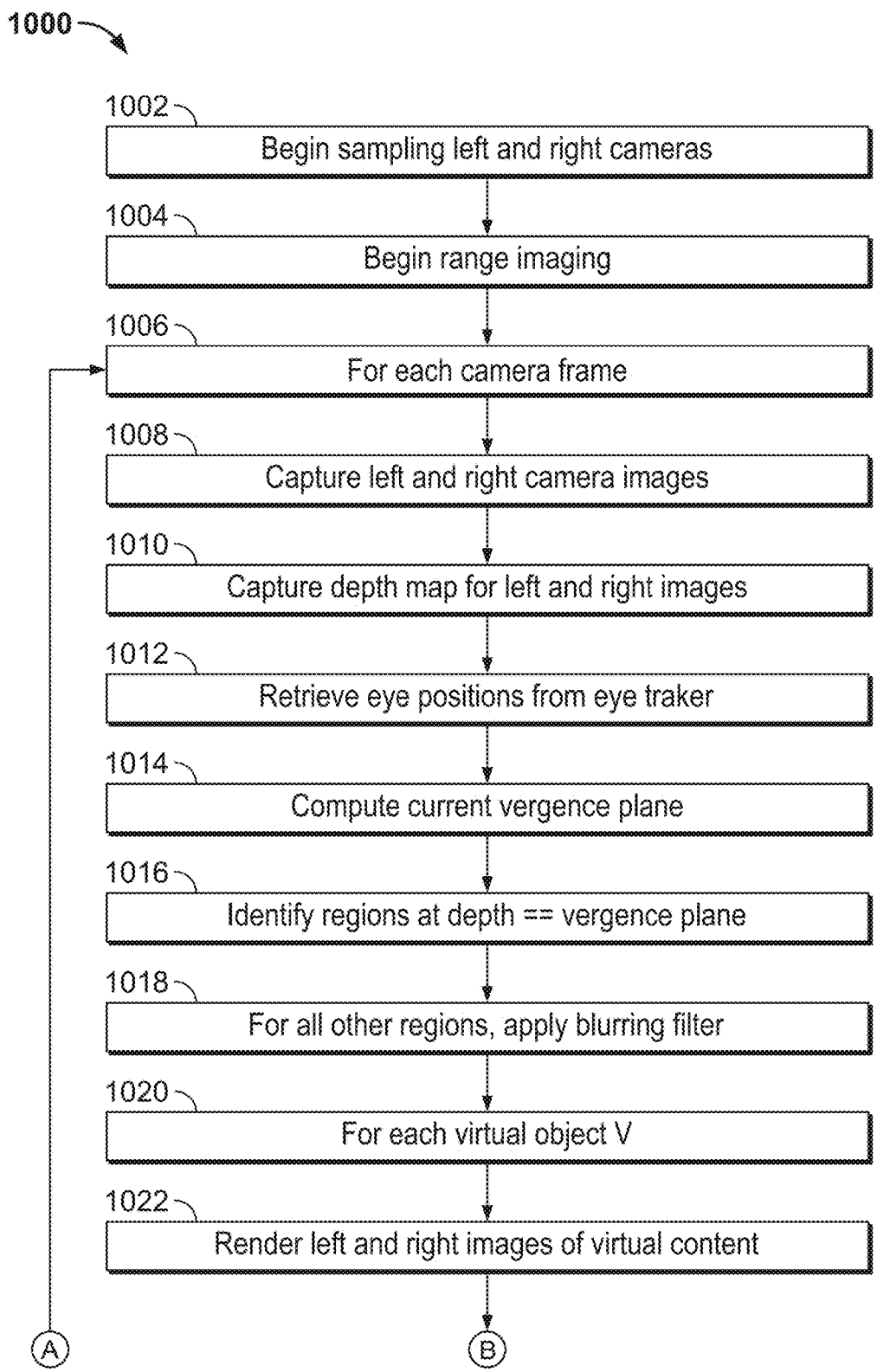
FIG. 10 is another flowchart of a detailed illustrative process for augmented reality image generation with selective blurring, in accordance with some embodiments of this disclosure.
Figure 10:
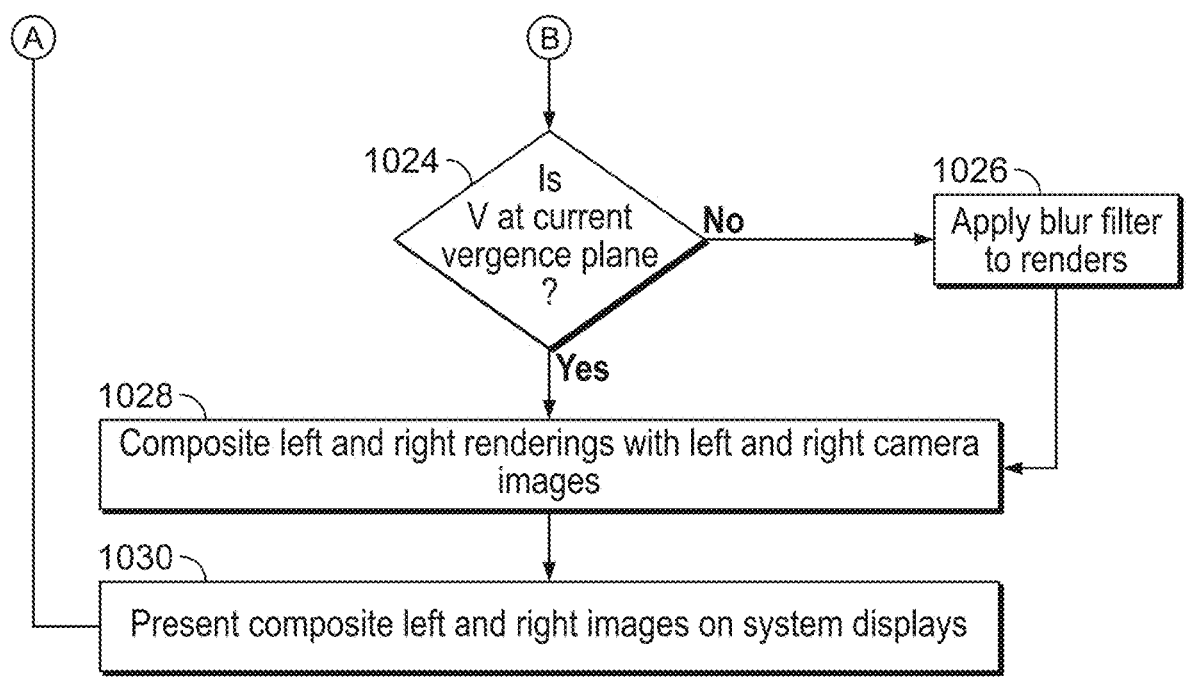

FIG. 10 is a flowchart of a detailed illustrative process 1000 for augmented reality image generation with selective blurring, in accordance with some embodiments of this disclosure. In various embodiments, the individual steps of process 1000 may be implemented by one or more components of the devices and systems of FIGS. 2 and 5-6.

As part of process 1000, control circuitry (e.g., control circuitry 611, control circuitry 618, or control circuitry of any of devices 607, 608, or 610) may execute a series of steps to achieve generation of an AR image or video, e.g., as shown in FIG. 2

At step 1002, the control circuitry begins sampling left and right camera (e.g., cameras 556), e.g., when AR application is launched. At step 1104, the control circuitry begins range imaging (e.g., using parallax in the signals of the cameras). Steps 1006-1030 may then be repeated for each capture frame.

At step 1008, a new capture from cameras is acquired. At step 1010 the new capture is analyzed by the control circuitry to identify a depth map for all pixels in the capture frame (e.g. using suitable ranging techniques). At step 1012, the control circuitry captures eyes position using an eye tracker (e.g., camera) of an AR display device. At step 1014, the control circuitry identifies dynamic user's vergence plane based on the captured eyes position.

At step 1012, the control circuitry identifies regions proximate to the vergence plane (e.g., regions defined by parallel planes offset by a pre-set distance from the vergence plane). At 1018, the control circuitry may apply blur filter to all pixels in the captured camera images defined by the depth map to be outside of the regions proximate to the vergence plane.

Steps 1020-1024 may be performed for each virtual object to be added to the captured camera images. At 1022, the virtual object may be pre-rendered using left and right display (e.g., display 550 and 552). If the object is at the vergence plane, blur filter is applied to it step 1026. At 1028, the composite image is generated using the modified captured image and inserted virtual objects. At step 1030, the composite image is displayed (e.g., on displays 550, 552).

Figure 11:
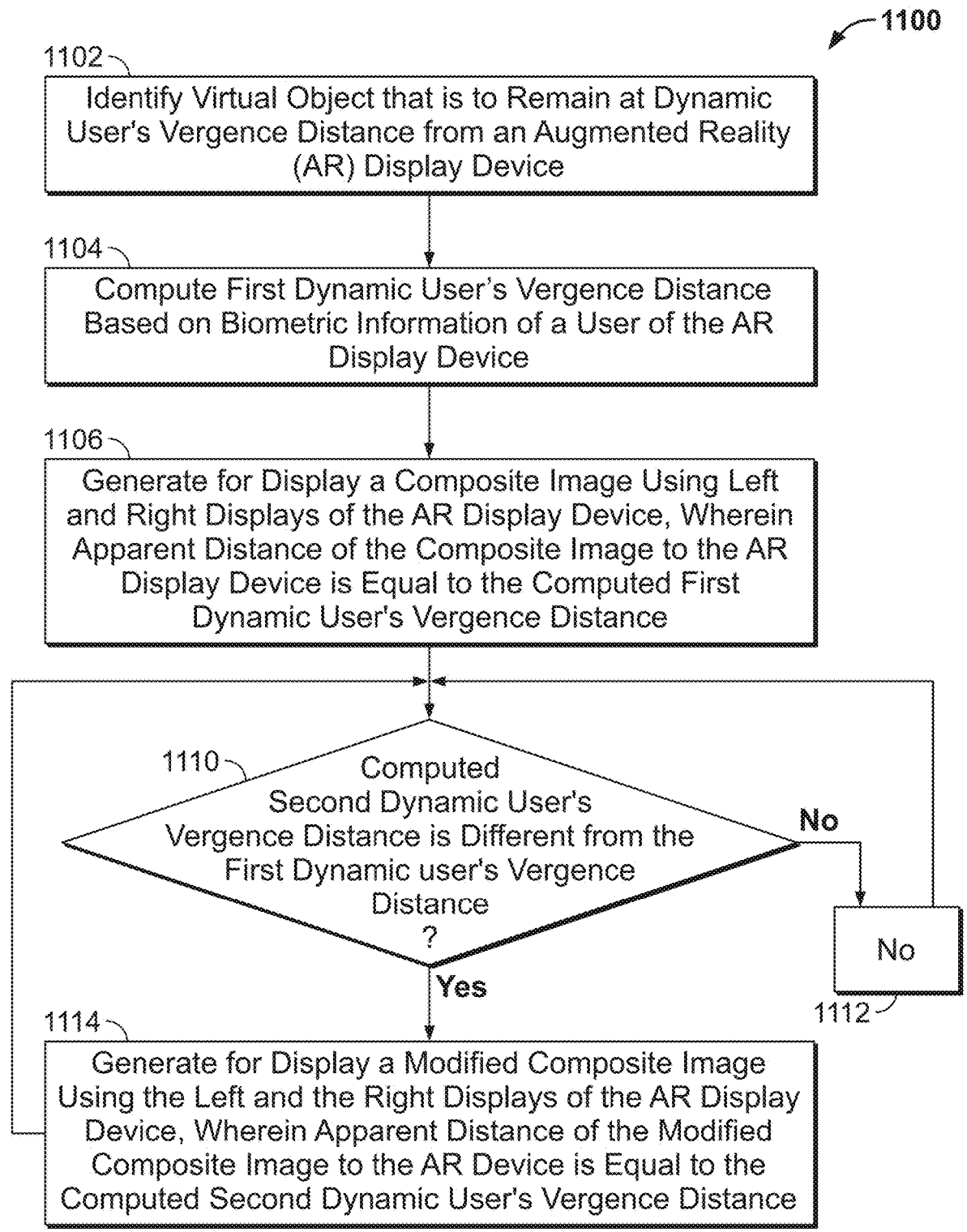
FIG. 11 is a flowchart of a detailed illustrative process for augmented reality image generation with an item that remains at user' dynamic vergence plane, in accordance with some embodiments of this disclosure.

FIG. 11 is a flowchart of a detailed illustrative process 1100 for augmented reality image generation with an item that remains at user's dynamic vergence plane, in accordance with some embodiments of this disclosure. In various embodiments, the individual steps of process 1100 may be implemented by one or more components of the devices and systems of FIGS. 3 and 5-6.

As part of process 1100, control circuitry (e.g., control circuitry 611, control circuitry 618, or control circuitry of any of devices 607, 608, or 610) may execute a series of steps to achieve generation of an AR image or video, e.g., as shown in FIG. 3.

At step 1102, the control circuitry identifying a virtual object that is to remain at dynamic user's vergence distance from an augmented reality (AR) display device. For example, the object may be a relevant system notification, a safety warning, or a supplemental content (e.g., an ad or object description).

At step 1104, control circuitry identifies dynamic user's vergence plane based on biometric information of the user. For example, the control circuitry may use cameras 556 to capture images of a user's eyes and compute a distance at which the gaze of each eye intersects and identify a plane parallel to a plane defined by human eyes at that distance.

At step 1106, the control circuitry generates for display a composite image using left and right displays of the AR display device (e.g., displays 550, 552), wherein apparent distance of the composite image to the AR display device is equal to the computed first dynamic user's vergence distance.

At step 1110, the control circuitry check if dynamic user's second vergence distance has changed (e.g., due to eye rotation). If not, the process ends 1112. Otherwise, at step 1114, the control circuitry generates for display a composite image using left and right displays of the AR display device (e.g., displays 550, 552), wherein apparent distance of the composite image to the AR display device is equal to a second newly computed dynamic user's vergence distance. In this way, the relevant messages may always remain at user's eye vergence level. Steps 1110-114 may be repeated for a certain period of time for which the inserted virtual object remains relevant.

Figure 12:
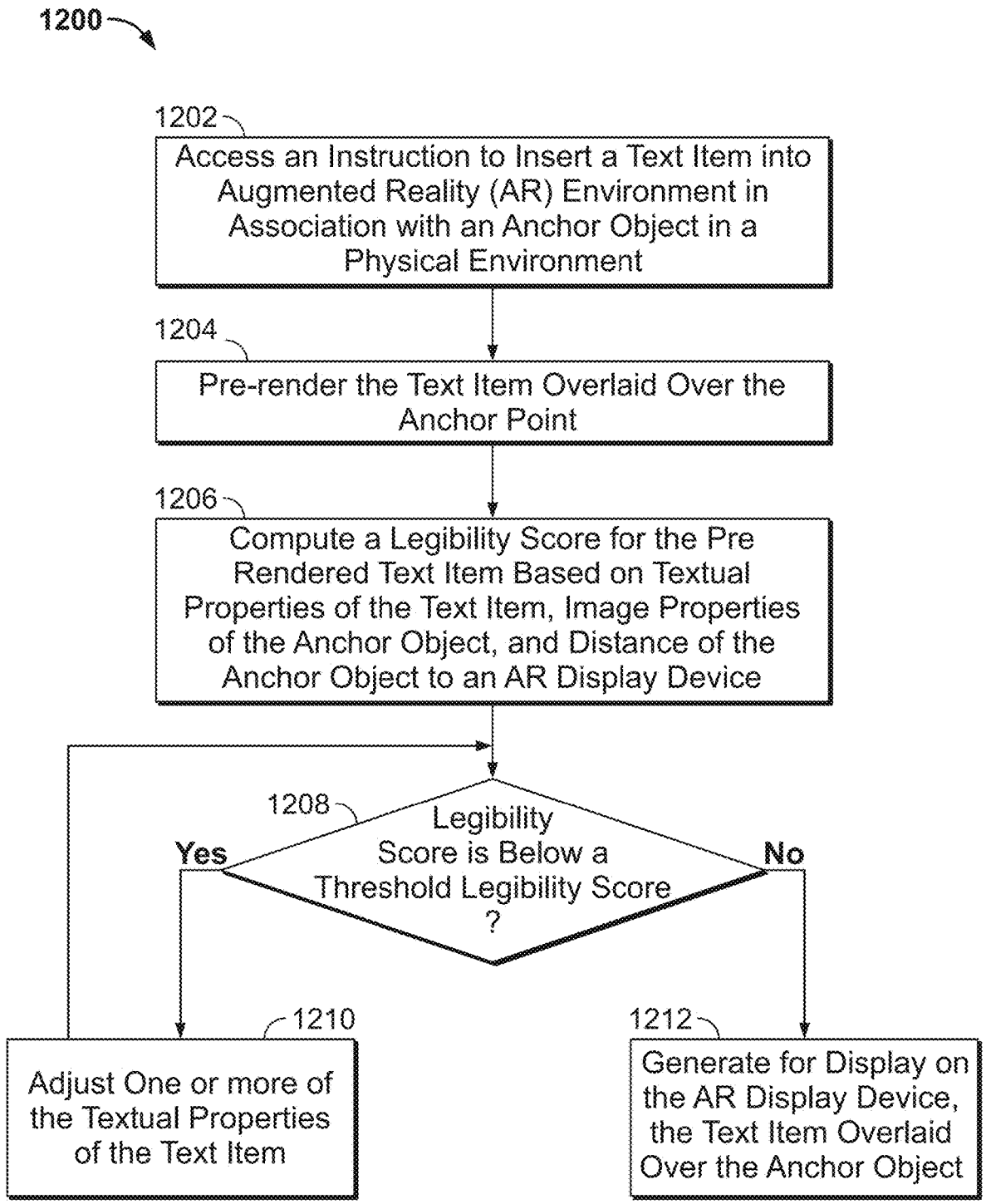
FIG. 12 is a flowchart of a detailed illustrative process for augmented reality image generation with textual item insertion, in accordance with some embodiments of this disclosure.

FIG. 12 is a flowchart of a detailed illustrative process 1200 for augmented reality image generation with an item with textual item insertion, in accordance with some embodiments of this disclosure. In various embodiments, the individual steps of process 1200 may be implemented by one or more components of the devices and systems of FIGS. 4-6.

As part of process 1200, control circuitry (e.g., control circuitry 611, control circuitry 618, or control circuitry of any of devices 607, 608, or 610) may execute a series of steps to achieve generation of an AR image or video, e.g., as shown in FIGS. 4A-4E.

At step 1202, the control circuitry accesses an instruction to insert a text item into Augmented Reality (AR) environment in association with an anchor object in a physical environment. For example, the text item may be textual description or and ad (as described in relation to FIGS. 1A-1C).

At step 1204, the control circuitry pre-renders the text item overlaid over the anchor point in accordance with textual properties the request. At 1206, the control circuitry computes a legibility score for the pre-rendered text item based on textual properties of the text item, image properties of the anchor object, and distance of the anchor object to an AR display device (an optionally the lighting conditions determined using camera 556). If the legibility score is determined, at step 1208, to be acceptable (e.g., above a threshold), the pre-rendered image is generated for display, at step 1314, on AR display device (e.g., device 518) using left and right displays (e.g., displays 550, 552) or a single see-through display.

At step 1210, the control circuitry may adjust or more of the textual properties of the text item in the pre-rendered image. The control circuitry may additionally or alternatively adjust one more visual properties of the anchor and lighting conditions. Exemplary types of adjustment are shown in FIGS. 4A-4E. For example, the adjustment maybe incremental. After each round of adjustment steep 1208 is repeated until legibility score becomes satisfactory.

Figure 13:
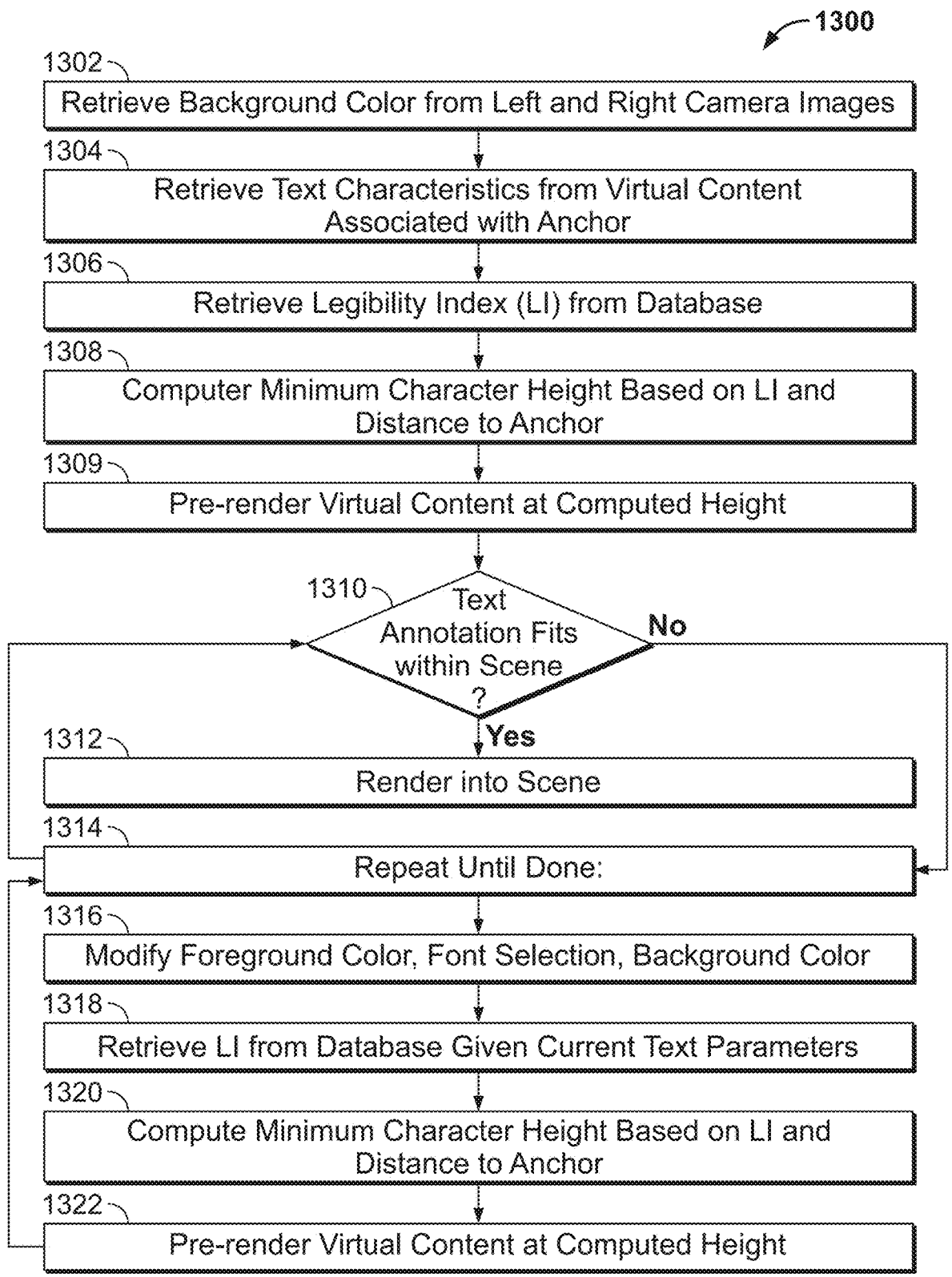
FIG. 13 is another flowchart of a detailed illustrative process for augmented reality image generation with textual item insertion, in accordance with some embodiments of this disclosure.

FIG. 13 is a flowchart of a detailed illustrative process 1300 for augmented reality image generation with an item with textual item insertion, in accordance with some embodiments of this disclosure. In various embodiments, the individual steps of process 1300 may be implemented by one or more components of the devices and systems of FIGS. 4-6.

As part of process 1300, control circuitry (e.g., control circuitry 611, control circuitry 618, or control circuitry of any of devices 607, 608, or 610) may execute a series of steps to achieve generation of an AR image or video, e.g., as shown in FIGS. 4A-4E.

At step 1302, the control circuitry retrieves image of the physical environment from one or more cameras (e.g., cameras 556). The image may include an anchor object (e.g., as described in relation to FIGS. 1A-1C). The system may identify a color of the anchor object.

At step 1306, the control circuitry retrieves text characteristics of virtual object that is to be insert in association with the anchor (e.g., as shown at element 403 of FIG. 4a). At 1306, the control circuitry may retrieve a legibility index (LI) from a database (e.g., database 420). In one approach the legibility index may be used to recover minimum acceptable height of the text at certain distance to be legible with legibility index being based on one or more of text characteristics of virtual object, color of the background, and lighting conditions.

At step 1308, the control circuitry may determine a minimum character height requirement based on the legibility index and distance of anchor away from eyes or from AR display device identified in step 1302. At 1309, the control circuitry may pre-render virtual version of the text into the image captured at step 1302 in association with anchor. At 1310, the control circuitry may use computer vision techniques to check if the text at the computed height fits into the anchor object. If so, the pre-rendered image is generated for display using the displays (e.g., displays 550, 552) of the AR device (e.g., device 518).

If the text at the computed height does not fit into the anchor object, the control circuitry may repeat steps 1314-1322 until it fits. At 1316, the control circuitry may modify one or more of: the textual properties of the text, the color of the anchor, lighting conditions, etc. (e.g., as shown in relation to FIGS. 4A-4E). At 1318, the control circuitry may retrieve a new legibility index from the database (e.g., database 420 in memory 614) that accounts for new textual, background, and/or light properties. A new minimum height maybe computed at step 1320 based on the new LI (and/or based on new distance if it has changed). The pre-rendering may then be repeated at step 1310. The steps may continue until the modified text virtual item fits within the anchor at height that is considered legible based on the legality index resulting in final render being done at step 1312. In some embodiments, if acceptable legibility cannot be achieved, the best possible version of the text is rendered. In some embodiments, if acceptable legibility cannot be achieved, the text is not inserted, and the control circuitry generates an error message or an alert.

The processes discussed above are intended to be illustrative and not limiting. One skilled in the art would appreciate that the steps of the processes discussed herein may be omitted, modified, combined and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
accessing an instruction to insert a text item into an Augmented Reality (AR) environment in association with an anchor object in a physical environment displayed as a generated video see-through (VST) image on a VST AR display device;
pre-rendering the text item over a representation of the anchor object in the VST image at a first apparent distance;
computing a legibility score for the pre-rendered text item based on textual properties of the text item, image properties of the representation of the anchor object, and a distance of the anchor object to the AR display device;
in response to determining that the legibility score is below a threshold legibility score:
changing an appearance of the representation of the anchor object by performing an image editing technique to remove the representation of the anchor object from a captured image of the physical environment and to re-insert a scaled-up version of the representation of the anchor object into the VST image; and
generating for display on the AR display device, the text item over the representation of the anchor object.

2. The method of claim 1, wherein the legibility score is further based on detected light level.

3. The method of claim 1, further comprising:
adjusting one or more of the textual properties of the text item by adjusting one or more of: font of the text item, color of the text item, and texture of the text item,
wherein the generating for display on the AR display device, comprises generating the adjusted text item over the representation of the anchor object.

4. The method of claim 1, further comprising:
adjusting one or more of the textual properties of the text item by replacing the text item with a shorter alternative version of the textual item.

5. The method of claim 1, further comprising:
capturing an image of the physical environment; and
generating for display the image of the physical environment to create the VST image of the physical environment on the AR display device.

6. The method of claim 5, further comprising:
in response to the determining that the legibility score is below the threshold legibility score:
modifying one or more of the image properties of the representation of the anchor object displayed in the VST image.

7. The method of claim 6, wherein the modifying one or more of the image properties of the representation of the anchor object comprises one or more of:
(a) changing color of the anchor object; or
(b) changing size of the anchor object.

8. The method of claim 5, further comprising:
in response to the determining that the legibility score is below the threshold legibility score:
modifying lighting level of the VST image.

9. The method of claim 1, further comprising:
in response to the determining that the legibility score is below the threshold legibility score:
adjusting one or more of the textual properties of the text item,
wherein the generating for display on the AR display device, comprises generating the adjusted text item over the representation of the anchor object.

10. A system comprising:
control circuitry configured to:
access an instruction to insert a text item into an Augmented Reality (AR) environment in association with an anchor object in a physical environment displayed as a generated video see-through image on a video see-through (VST) AR display device;
pre-render the text item over a representation of the anchor object in the VST image at a first apparent distance;
compute a legibility score for the pre-rendered text item based on textual properties of the text item, image properties of the representation of the anchor object, and a distance of the anchor object to an AR display device;
in response to determining that the legibility score is below a threshold legibility score: change an appearance of the representation of the anchor object by performing an image editing technique to remove the representation of the anchor object from a captured image of the physical environment and to re-insert a scaled-up version of the representation of the anchor object into the VST image; and
input/output circuitry configured to:
generate for display on the AR display device, the text item over the representation of the anchor object.

11. The system of claim 10, wherein the legibility score is further based on detected light level.

12. The system of claim 10, wherein the control circuitry is configured to adjust one or more of the textual properties of the text item by adjusting one or more of: font of the text item, color of the text item, and texture of the text item.

13. The system of claim 10, wherein the control circuitry is configured to adjust one or more of the textual properties of the text item by replacing the textual item with a shorter alternative version of the textual item.

14. The system of claim 10, wherein the control circuitry is configured to:
capture an image of the physical environment; and
generate for display the image of the physical environment to create the VST image of the physical environment on the AR display device.

15. The system of claim 14, wherein the control circuitry is configured to:
in response to the determining that the legibility score is below the threshold legibility score:
modify one or more of the image properties of the representation of the anchor object displayed in the VST image.

16. The system of claim 15, wherein the control circuitry is configured to modify one or more of the image properties of the representation of the anchor object by one or more of:
(a) changing color of the anchor object; or
(b) changing size of the anchor object.

17. A system comprising:
means for accessing an instruction to insert a text item into Augmented Reality (AR) environment in association with an anchor object in a physical environment displayed as a generated video see-through (VST) image on a video see-through AR display device;
means for pre-rendering the text item over a representation of the anchor object in the VST image at a first apparent distance;

means for computing a legibility score for the pre-rendered text item based on textual properties of the text item, image properties of the representation of the anchor object, and a distance of the anchor object to an AR display device;

means for changing an appearance of the representation of the anchor object, in response to determining that the legibility score is below a threshold legibility score, by performing an image editing technique to remove the representation of the anchor object from a captured image of the physical environment and to re-insert a scaled-up version of the representation of the anchor object into the generated VST image; and means for generating for display on the AR display device, the text item over the representation of the anchor object.

18. The system of claim 17, wherein the legibility score is further based on detected light level.

\* \* \* \* \*